(12) United States Patent
Wu et al.

(10) Patent No.: US 12,445,299 B2
(45) Date of Patent: Oct. 14, 2025

(54) SERVICE COMMUNICATION METHOD, SYSTEM, APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Yueting Wu, Shenzhen (CN); Yuebo Liu, Shenzhen (CN); Dongyun Cai, Shenzhen (CN); Qilin Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 429 days.

(21) Appl. No.: 17/974,067

(22) Filed: Oct. 26, 2022

(65) Prior Publication Data

US 2023/0056432 A1 Feb. 23, 2023

Related U.S. Application Data

(63) Continuation of application No. PCT/CN2021/125653, filed on Oct. 22, 2021.

(30) Foreign Application Priority Data

Nov. 5, 2020 (CN) .......................... 202011222173.X

(51) Int. Cl.
*H04L 9/32* (2006.01)
(52) U.S. Cl.
CPC .......... *H04L 9/3247* (2013.01); *H04L 9/3268* (2013.01)
(58) Field of Classification Search
CPC ..... H04L 9/3247; H04L 9/0825; H04L 9/088; H04L 9/3236; H04L 9/0819;
(Continued)

(56) References Cited

U.S. PATENT DOCUMENTS

| 2005/0005101 A1* | 1/2005 | Yenduri | G06F 21/57 |
| | | | 713/187 |
| 2010/0188975 A1* | 7/2010 | Raleigh | H04L 63/04 |
| | | | 370/230.1 |

(Continued)

FOREIGN PATENT DOCUMENTS

| CN | 106790080 A | 5/2017 |
| CN | 110535648 A | 12/2019 |

(Continued)

OTHER PUBLICATIONS

Japanese Office Action issued Apr. 1, 2024 in Application No. 2023-515835.

(Continued)

*Primary Examiner* — Eric W Shepperd
(74) *Attorney, Agent, or Firm* — Sughrue Mion, PLLC

(57) ABSTRACT

A service communication method, system, apparatus, electronic device, computer-readable storage medium, and computer program product; the method includes: receiving an authentication request sent by a service access process, performing synchronous verification processing on the service access process, and performing asynchronous verification processing on the service access process; determining service key information allocated for the service access process according to a synchronous verification processing result of the service access process, sending the service key information to the service access process to perform encrypted service communication with the service access process based on the service key information, and controlling a communication connection used for bearing the encrypted service communication with the service access process according to an asynchronous verification processing result of the service access process.

20 Claims, 18 Drawing Sheets

(58) Field of Classification Search
CPC . H04L 63/0428; H04L 63/062; H04L 63/045; H04L 63/08; H04L 63/0876; H04L 63/12
See application file for complete search history.

(56) References Cited

U.S. PATENT DOCUMENTS

| | | | | |
|---|---|---|---|---|
| 2010/0229241 | A1* | 9/2010 | Liu | H04L 9/321 726/26 |
| 2011/0010539 | A1* | 1/2011 | Salomone | H04L 9/3271 713/168 |
| 2016/0188317 | A1* | 6/2016 | Hilliar | H04L 67/34 717/172 |
| 2017/0006009 | A1* | 1/2017 | Hessler | G06F 21/316 |
| 2017/0171240 | A1* | 6/2017 | Arzi | H04L 63/1416 |
| 2017/0180412 | A1* | 6/2017 | Mikulski | H04L 9/3247 |
| 2019/0089524 | A1* | 3/2019 | Lv | H04L 9/0643 |
| 2019/0236284 | A1* | 8/2019 | Hersans | G06F 21/602 |
| 2019/0342095 | A1* | 11/2019 | Simons | H04L 69/26 |
| 2020/0145397 | A1* | 5/2020 | Wu | H04L 67/12 |
| 2020/0186363 | A1* | 6/2020 | Shockley | H04L 9/0891 |
| 2020/0259827 | A1 | 8/2020 | Shaffer et al. | |
| 2020/0336481 | A1* | 10/2020 | Fan | H04L 9/0869 |
| 2021/0037000 | A1* | 2/2021 | Attard | G06N 20/00 |

FOREIGN PATENT DOCUMENTS

| | | |
|---|---|---|
| CN | 110535807 A | 12/2019 |
| CN | 111212075 A | 5/2020 |
| CN | 112422532 A | 2/2021 |
| JP | 2011-523481 A | 8/2011 |
| JP | 2018-029241 A | 2/2018 |
| KR | 10-2006-0128885 A | 12/2006 |
| KR | 10-2008-0088004 A | 10/2008 |
| KR | 10-1946527 B1 | 2/2019 |

OTHER PUBLICATIONS

Translation of Written Opinion dated Jan. 19, 2022, issued in International Application No. PCT/CN2021/125653.
Written Opinion of PCT/CN2021/125653 dated Jan. 19, 2022.
International Search Report for PCT/CN2021/125653 dated Jan. 19, 2022.
Office Action issued Aug. 25, 2025 in Korean Application No. 10-2023-7008870.

* cited by examiner

| Strategy management | |
|---|---|
| Account tree<br>∨ ⊟ Network-wide account<br>　> ⊟ test<br>　∨ ⊟ testgroup<br>　　👤 lemon | ⊚ Trusted application configuration |

| ⊚ Application packet | Operating System | Inheritance |
|---|---|---|
| ☑ Any application | Windows | |
| ☐ Any application | Mac | |

Search application packet　　☑ Windows　☑ Mac

⊚ Service system configuration

Search service system

| ☑ Service system | Inheritance |
|---|---|
| ☑ All urls | |

Save settings

FIG. 5

Process details (process information)

| Process name: | xxmeetapp.exe | Application name: | xx conference |
|---|---|---|---|
| Operating system: | Windows | Manufacturer: | xx Corporation.<br>All rights reserved |
| Signature information: | ... | Test results: | Unknown |
| Version: | 1.5.8.456 | | |
| MD5: | 005C04E9AD... | | |
| SHA256: | 7dc65bf07879e... | | |

Confirm

FIG. 6

| Security manager | Zero-trust gateway | Service system | Application management | Strategy management | Details about data | Access user management |
|---|---|---|---|---|---|---|

Gateway: [Please enter...]  [Query]

[Add gateway]  [Delete in batches]

| | Gateway name | Gateway setting |
|---|---|---|
| ☐ | Gateway 1 | 45.45.45.45:45 |
| ☐ | Gateway 2 | 123.123.123.123:123 |
| ☐ | Gateway 3 | 9.134.236.111:9443 |
| ☐ | Gateway 4 | 9.134.235.68:9443 |
| ☐ | Gateway 5 | 9.134.236.111:9443, 9.134.235.68:9443... |

FIG. 7

| Edit zero-trust gateway | | | | ✕ |
|---|---|---|---|---|

*Gateway name

Gateway 4

*Gateway setting                                                    + Add

IP address: 9.134.235.68       Port number: 9443

Clients in the following IP segments preferentially access the gateway (optional):

| IP group | IP segment start address | IP segment end address | Operate |
|---|---|---|---|
| 00000 | 0.0.0.0 | 255.255.255.255 | Delete |

| Please enter IP group name | Please enter start IP | Please enter end IP | Add |
|---|---|---|---|

Cancel    Confirm

FIG. 8

| Security manager | Zero-trust gateway | Service system | Application management | Strategy management | Details about data | Access user management |

| System combination ⊙ | Service system: | Please enter the service system | | Please enter domain name, IP, port | | Creation time: | Start time ~ End |
|---|---|---|---|---|---|---|---|

System combination 1
System combination 2
System combination 3

Add system | Copy system | Deletion in batches

| | Service system | Type | IP/domain name | Port | Gateway that can access to the service system |
|---|---|---|---|---|---|
| ☐ | Service system 1 | Domain name | *.xitong1.com | All ports | Gateways 1 and 2 |
| ☐ | Service system 2 | Domain name | *.xitong2.com | All ports | Gateway 3 |
| ☐ | Service system 3 | Domain name | *.xitong3.com | All ports | Gateways 3 and 4 |
| ☐ | Service system 4 | Domain name | *xitong4.cn | All ports | Gateways 3 and 4 |

FIG. 9

| Newly-added accessible service system | × |

*Service system: [                    ]

*Category: [IP ▼]

*IP: ⦿    ○

[Example: 127.0.0.1]

[+ Add IP]

*Port: ○ All ports  ⦿ Specified port

[Example: 8000]

[+ Add port]

[Cancel] [Confirm]

SERVICE COMMUNICATION METHOD, SYSTEM, APPARATUS, ELECTRONIC DEVICE, AND STORAGE MEDIUM

CROSS-REFERENCE TO RELATED APPLICATION(S)

This application is a continuation application of International Application No. PCT/CN2021/125653, filed on Oct. 22, 2021, which claims priority to Chinese patent application No. 202011222173.X, filed with the China National Intellectual Property Administration on Nov. 5, 2020, the disclosures of which are incorporated by reference in their entireties.

FIELD

This disclosure relates to communication technologies, and more particularly, to a service communication method, system, apparatus, electronic device, computer-readable storage medium, and computer program product.

BACKGROUND

In a service scenario, interface invocation often occurs, for example, invocation of an interface of one process of a terminal device by another process of the terminal device, for another example, invocation of an interface of a process of a server by the process of the terminal device. The interface invocation is to achieve service communication, e.g. sending or requesting particular data, etc.

In schemes provided by the related art, for the invocation of a service access process (i.e., an invoker process), a fixed key is usually designated by the service access process, and subsequent encrypted service communication is performed based on the key. However, the key is easy to be used by malicious processes, resulting in insufficiency of security of service communication, which cannot effectively ensure the service.

SUMMARY

Some embodiments may provide a service communication method, including: receiving an authentication request sent by a service access process; performing synchronous verification processing on the service access process, and performing asynchronous verification processing on the service access process; determining service key information allocated for the service access process according to a synchronous verification processing result of the service access process; sending the service key information to the service access process for encrypted service communication with the service access process based on the service key information; and controlling a communication connection used for bearing the encrypted service communication with the service access process according to an asynchronous verification processing result of the service access process.

Some embodiments may provide a service communication system including a service access client, a security client and a security server; where the service access client runs a service access process; the security client is configured to: receive an authentication request sent by the service access process; perform synchronous verification processing on the service access process, and notify the security server to perform asynchronous verification processing on the service access process; determine service key information allocated for the service access process according to a synchronous verification processing result of the service access process; send the service key information to the service access process for encrypted service communication with the service access process based on the service key information; and control a communication connection used for bearing the encrypted service communication with the service access process according to an asynchronous verification processing result of the security server on the service access process.

Some embodiments may provide a service communication apparatus including: a receiving module configured to receive an authentication request sent by a service access process; a verification module configured to perform synchronous verification processing on the service access process, and perform asynchronous verification processing on the service access process; a determination module configured to determine service key information allocated for the service access process according to a synchronous verification processing result of the service access process; a sending module configured to send the service key information to the service access process for encrypted service communication with the service access process based on the service key information; and a connection control module configured to control a communication connection used for bearing the encrypted service communication with the service access process according to an asynchronous verification processing result of the service access process.

Some embodiments may provide an electronic device, including: a memory, configured to store executable instructions; and a processor, configured to perform the service communication method provided by some embodiments when executing the executable instructions stored in the memory.

Some embodiments may provide a non-transitory computer-readable storage medium, storing executable instructions, the executable instructions, configured to cause the processor, when executing, to perform the service communication method provided by the foregoing embodiments.

Some embodiments may provide a computer program product, including executable instructions, the executable instructions, when executed by a processor, performing the service communication method provided by some embodiments.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 5 is a schematic diagram of a strategy management interface of a security manager according to some embodiments.

FIG. 6 is a schematic diagram of process information according to some embodiments.

FIG. 7 is a schematic diagram of a zero-trust gateway interface of a security manager according to some embodiments.

FIG. 8 is a schematic diagram of a configuration interface of a zero-trust gateway according to some embodiments.

FIG. 9 is a schematic diagram of a service system interface of a security manager according to some embodiments.

FIG. 10 is a schematic diagram of a configuration interface of a service system according to some embodiments.

FIG. 13 is a schematic diagram of a strategy management interface of a security manager according to some embodiments.

FIG. 14 is a schematic diagram of a security client interface according to some embodiments.

DESCRIPTION OF EMBODIMENTS

Figure 1:
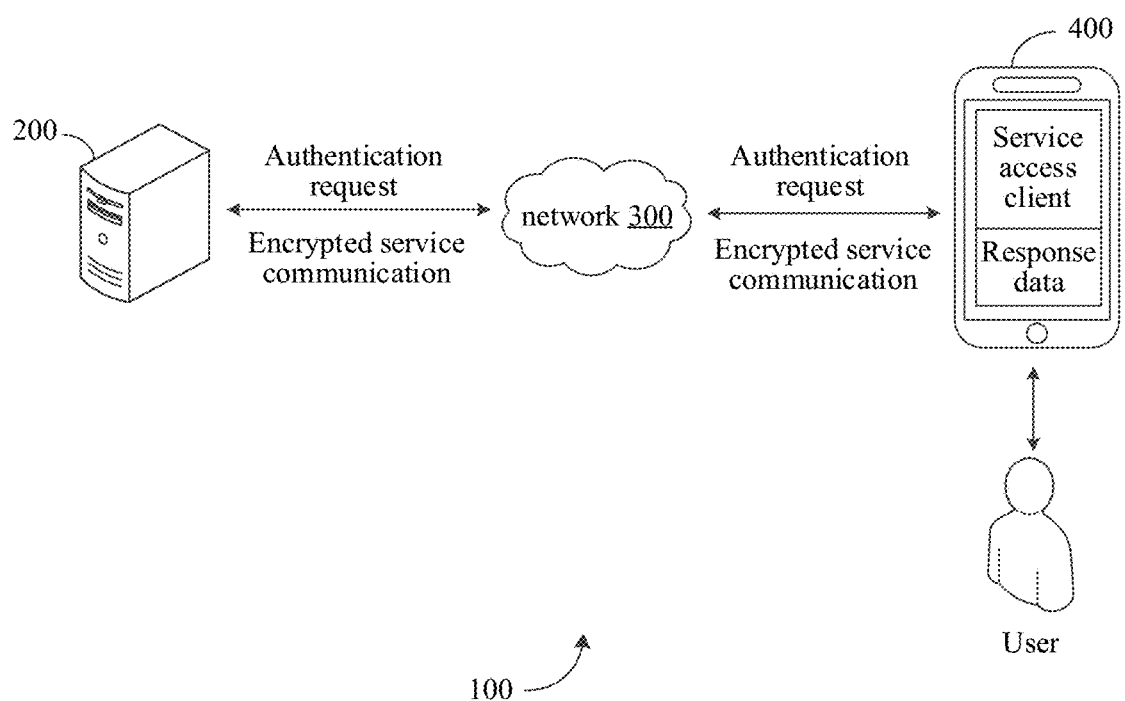
FIG. 1 is a schematic architectural diagram of a service communication system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that some embodiments described herein can be implemented in a sequence in addition to the sequence shown or described herein. In the following description, the related term "plurality" means at least two.

Unless otherwise defined, meanings of all technical and scientific terms used in this specification are the same as that usually understood by a person skilled in the related technical field. Terms used in this specification are merely intended to describe objectives of the embodiments, but are not intended to limit the disclosure.

Before the embodiments are further described in detail, a description is made on nouns and terms in some embodiments, and the nouns and terms in the embodiments are applicable to the following explanations.

(1) Service access process: it refers to an invoker process, where an embodiment does not define the type of a service access process, for example, the service access process may be an application process (such as a process of a certain conference application), or may be a process dedicated to proxying a service request of the application process.

(2) Synchronous verification processing: only when synchronous verification processing is completed, i.e., a synchronous verification processing result is obtained, can other operations be executed. In some embodiments, synchronous verification processing on a service access process and synchronous verification processing on an application process are involved, for instance, an operation determining service key information allocated for the service access process is executed only when a synchronous verification processing result of the service access process is obtained.

(3) Asynchronous verification processing: other operations may be executed during the asynchronous verification processing. In some embodiments, asynchronous verification processing on a service access process and synchronous authentication processing on an application process are involved, for instance, during the asynchronous verification processing on the service access process, encrypted service communication with the service access process can be performed.

(4) Service key information: it is used for encrypted service communication, where the service key information at least includes a key, and may also include information such as a key identifier.

(5) Signature information: it generally refers to information related to a digital signature, and may include, for example, the digital signature itself, and certificate information, etc.

(6) Hash: an input of arbitrary length is transformed into an output of fixed length, i.e., a Hash value (also known as Hash result), by a hashing algorithm (also known as hashing process), so that the input can be identified by the obtained Hash value. Hash algorithms include a Message-Digest (MD) algorithm and a Secure Hash Algorithm (SHA).

(7) Symmetric keys: it refers to a party sending data and a party receiving data using the same key for encryption and decryption, and an embodiment does not limit the method for generating a symmetric key, for example, the symmetric key can be generated by an Advanced Encryption Standard (AES) algorithm.

(8) Asymmetric key pair: it includes a public key and a private key, where a party sending data encrypts the data via the public key, and a party receiving the data decrypts the encrypted data via the private key, alternatively, the data may be encrypted with the private key, and the encrypted data may be decrypted with the public key. An embodiment does not limit the way the asymmetric key pair is generated. For example, the asymmetric key pairs may be generated by an RSA algorithm.

(9) Service gateway: it is used for forwarding the received service request to a corresponding service server to realize a proxy for the service request. In some embodiments, the service gateway may be implemented in software or in hardware.

(10) Service server: it is a server for providing service resources, for example, for a conference service, a background server of a conference application is a service server for providing data support for networking operation of the conference application.

(11) Blockchain: is an encrypted chain storage structure for transaction formed by a block.

(12) Blockchain network: it is a set of nodes that incorporate a new block into a blockchain in a consensus way.

Some embodiments provide a service communication method, system, apparatus, electronic device and non-transitory computer-readable storage medium capable of improving the security of service communication. Some embodiments of the electronic device, which may be implemented as a terminal device or as a server, are described below.

FIG. 1 is a schematic diagram of architecture of service communication system 100 according to some embodiments. A terminal device 400 is connected to a server 200 by using a network 300. The network 300 may be a wide area network or a local area network, or a combination thereof. The terminal device 400 runs a service access client.

In some embodiments, taking an electronic device being a terminal device as an example, the service communication method may be implemented by the terminal device. For example, a service access client in the terminal device 400 may invoke an interface of an application process of an application client in the terminal device 400 via a running service access process, i.e., the application client may receive an authentication request sent by the service access process. At this time, the application client can perform synchronous verification processing and asynchronous verification processing on the service access process, determine the allocated service key information according to a synchronous verification processing result, and perform encrypted service communication with the service access process based on the service key information; and the application client can also control the communication connection with the service access process according to an asynchronous verification processing result upon obtaining the asynchronous verification processing result. Based on the established encrypted service communication, the service access process can achieve a variety of service purposes, which are not limited here.

For instance, the service access process may be an application process of an instant communication application client (hereinafter referred to as client A), and the application process of a file management client (hereinafter referred to as client B) is invoked; when a certain file link (such as a file link shared in a session interface) in the client A is triggered by a user, the application process of the client A invokes an interface of the application process of the client B to establish encrypted service communication with the application process of the client B. On the basis that encrypted service communication has been established, the application process of the client A can send a service request including the file link to the application process of the client B, and the application process of the client B queries a file (i.e., response data) corresponding to the file link from the managed files, and sends the queried file to the application process of the client A to display in the interface of the client A.

In some embodiments, where the electronic device is a server, the service communication method may be implemented by the server. For example, a service access client in the terminal device 400 may invoke an interface of a process running in the server 200 through a running service access process, i.e., the server 200 may receive an authentication request sent by the service access process. At this time, the server 200 may perform synchronous authentication processing and asynchronous verification processing on the service access process to establish encrypted service communication with the service access process. For instance, a service access client may be a client of a certain application, a server 200 is a background server of the application, and the service access client may establish encrypted service communication with a process in the server 200 via a service access process to request application data (i.e., response data) from the process in the server 200.

In some embodiments, the service communication method may also be cooperatively implemented by a terminal device and a server. For example, the terminal device 400 has a security client running therein, and the server 200 is a security server. When the security client receives the authentication request sent by the service access process, the security client performs synchronous verification processing on the service access process, and notifies the security server to perform asynchronous verification processing on the service access process, to establish encrypted service communication with the service access process.

In some embodiments, the terminal device 400 or the server 200 can implement the service communication method by running a computer program, for example, the computer program may be a native program or a software module in an operating system; it may be a Native application (APP), i.e., a program which needs to be installed in an operating system to be able to run; it may also be a small program, i.e., a program which can run by just loading into a browser environment; and it may also be an applet that can be embedded into any APP, where the applet component can be run or shut down under user control. In general, the computer program may be any form of application, module or plug-in.

In some embodiments, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The cloud service may be an asynchronous verification service for the terminal device 400 to invoke. The terminal device 400 may be a smartphone, a tablet computer, a notebook computer, a desktop computer, a smart television (TV), a smart speaker, a smartwatch, or the like, but is not limited thereto. The terminal device and the server may be directly or indirectly connected in a wired or wireless communication manner. This is not limited herein.

Figure 2:
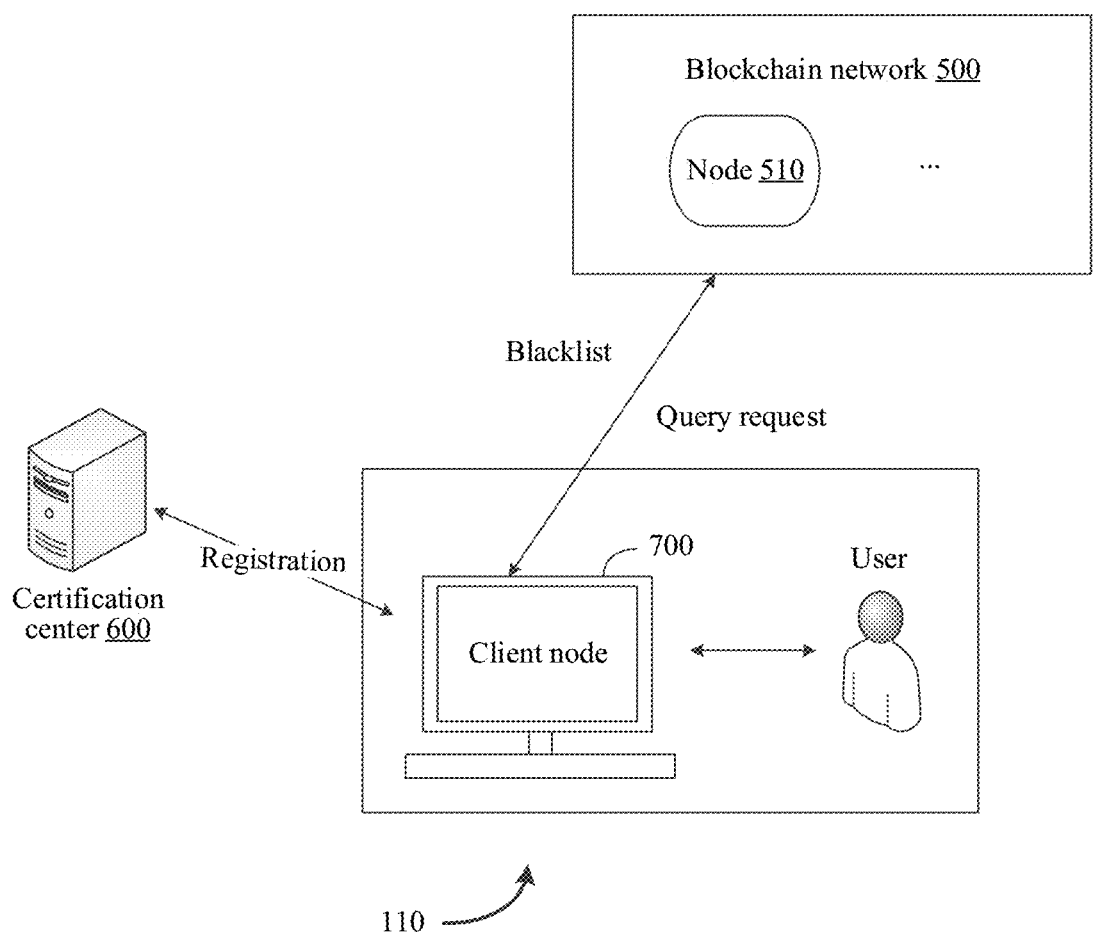
FIG. 2 is a schematic architecture diagram of a service communication system incorporating a blockchain network according to some embodiments.

FIG. 2 is a schematic architectural diagram of a service communication system 110 incorporating a blockchain network according to some embodiments. The system includes a blockchain network 500 (the blockchain network 500 generally includes a plurality of nodes, illustrated as nodes 510 herein), an authentication center 600, and an electronic device 700. The electronic device 700 may be a server (e.g. the server 200 shown in FIG. 1) or a terminal device (e.g. the terminal device 400 shown in FIG. 1), depending on practical application scenarios. The authentication center 600 is configured to issue digital certificates to the electronic device 700.

The electronic device 700 may access the blockchain network 500, become a client node of the blockchain network 500, and further query data stored in a blockchain, where the blockchain may be used for storing various information in a service communication process. For example, the electronic device 700 may query a blacklist stored in a blockchain to perform at least one of synchronous authentication processing and asynchronous verification processing on a service access process based on the blacklist.

Figure 3:
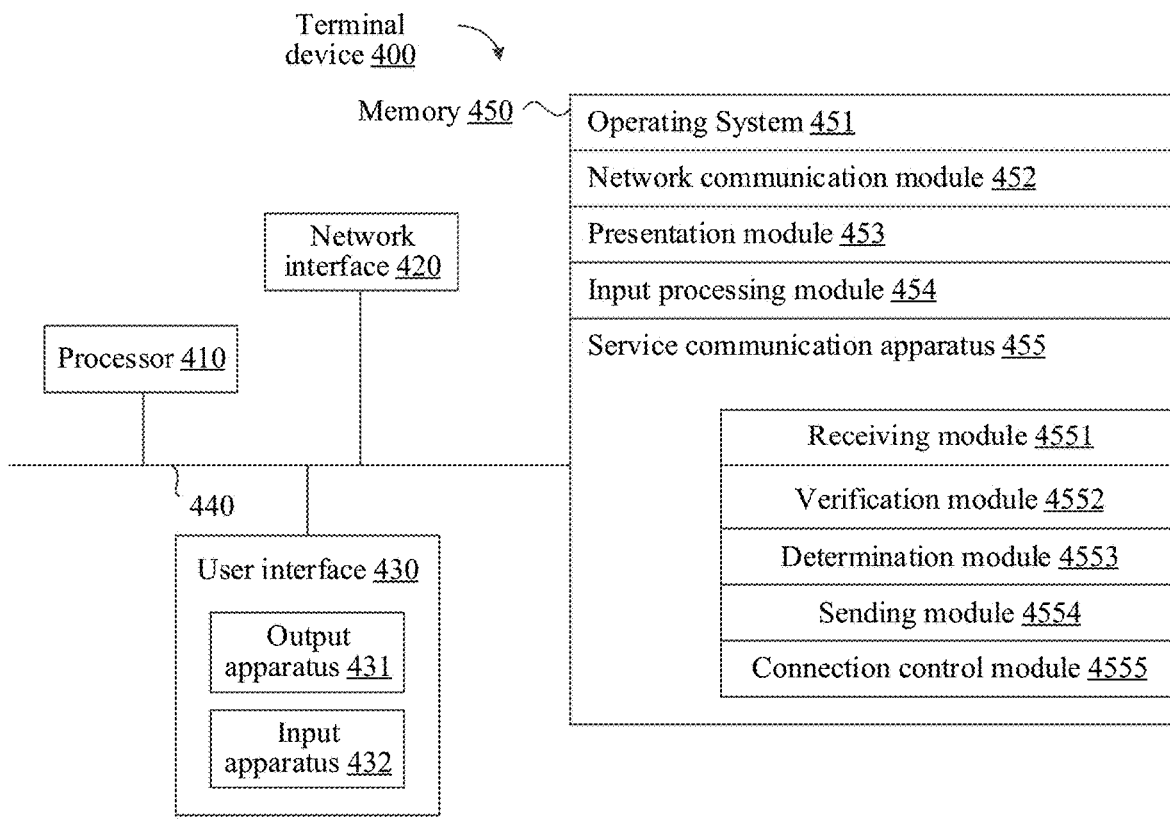
FIG. 3 is a schematic architecture diagram of a terminal device according to some embodiments.

Illustrated by the electronic device according to some embodiments, which is a terminal device, it will be appreciated that for the case where the electronic device is a server, portions of the structure shown in FIG. 3 (e.g. a user interface, a presentation module, and an input processing module) may be default. FIG. 3 is a schematic structural diagram of a terminal device 400 according to some embodiments. The terminal device 400 shown in FIG. 3 includes: at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses in FIG. 3 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 optionally includes one or more storage devices physically remote from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in the embodiments is to include any other suitable type of memories.

In some embodiments, the memory 450 is capable of storing data to support various operations, examples of which include programs, modules, and data structures or subsets or superset thereof, as exemplified below.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), and the like.

A display module 453 is configured to display information by using an output apparatus 431 (such as, a display screen or a speaker) associated with one or more user interfaces 430 (such as, a user interface configured to operate a peripheral device and display content and information).

An input processing module 454 is configured to detect one or more user inputs or interactions from one of the one or more input apparatuses 432 and translate the detected inputs or interactions.

In other embodiments, the service communication apparatus may be implemented in the form of software. FIG. 3 shows a service communication apparatus 455 stored in the memory 450, which may be software in the form of a program, a plug-in, or the like, and include the following software modules: a receiving module 4551, a verification module 4552, a determination module 4553, a sending module 4554 and a connection control module 4555, and these modules are logical. Therefore, any combination or further division can be performed according to the functions to be realized. The following describes functions of the modules.

The service communication method according to some embodiments is described with reference to an example application and implementation of the electronic device.

Figure 4A:
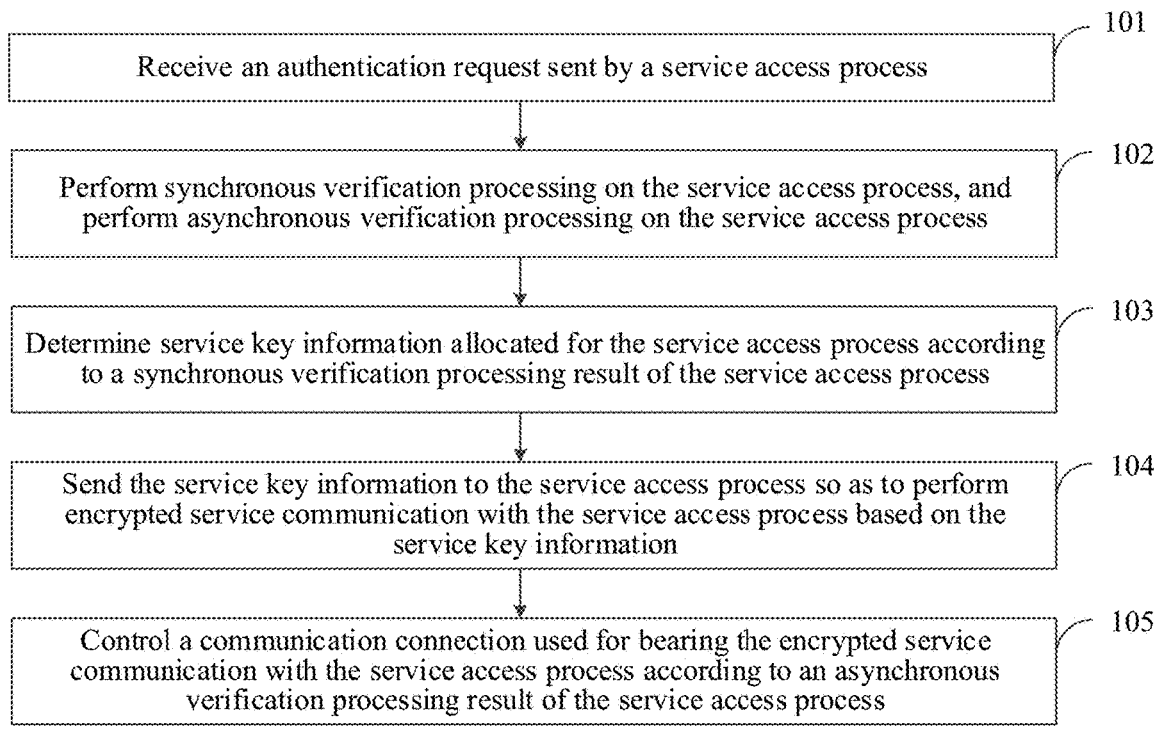
FIG. 4A is a flow chart of a service communication method according to some embodiments.

FIG. 4A is a flow chart of a service communication method according to some embodiments. The method will be described in conjunction with the operations shown in FIG. 4A.

Operation 101: Receive an authentication request sent by a service access process.

Here, the electronic device receives an authentication request sent by the service access process, for example, an authentication interface (such as a certain port) may be predetermined in the electronic device, and when the electronic device receives an invocation request of the service access process for the authentication interface, the invocation request is taken as the authentication request. The service access process may be an application process of a certain application client and may also be used for proxying the application client, which will be described later. The embodiments do not limit the type of service, which may be, for example, an instant communication service or a video service, etc.

Operation 102: Perform synchronous authentication processing on the service access process, and perform asynchronous verification processing on the service access process.

Here, for the service access process, synchronous authentication processing and asynchronous verification processing are performed to verify the validity thereof. An embodiment does not define an execution order of the synchronous verification processing and the asynchronous verification processing. For example, they may be executed simultaneously. For another example, when the synchronous verification processing result is verification success, the asynchronous verification processing is executed then.

An embodiment also does not define the processing modes of the synchronous verification processing and the asynchronous verification processing. For example, verification objects of the synchronous verification processing and the asynchronous verification processing may be the same, and the verification objects are process information about a service access process, and the difference between the two lies in that the synchronous verification processing is executed only once, while the asynchronous verification processing is executed periodically multiple times.

Operation 103: Determine service key information allocated for the service access process according to a synchronous verification processing result of the service access process.

For example, it can be judged whether to determine the service key information allocated for the service access process according to the synchronous verification processing result of the service access process. The service key information includes at least a key, and may further include a key identifier, etc. The service key information may be pre-allocated for a service access process or may be allocated in real time, which is not limited.

In order to further improve the security, the electronic device may also periodically update the service key information allocated for the service access process, and perform invalidation processing (also referred to as invalid processing) on the service key information before the update to trigger the service access process to resend the authentication request to acquire the updated service key information.

In some embodiments, the authentication request includes an authentication request address. The above-mentioned determination of the service key information allocated for the service access process can be realized in such a manner: allocating different service key information with respect to authentication request addresses sent by the different service access processes, and allocating different service key information with respect to different authentication request addresses sent by the same service access process; allocating different service key information with respect to authentication request addresses sent by the different service access processes, and allocating same service key information with respect to different authentication request addresses sent by the same service access process; and allocating same service key information with respect to authentication request addresses sent by the different service access processes, and allocating same service key information with respect to different authentication request addresses sent by the same service access process.

Here, the electronic device may predetermine a plurality of authentication request addresses in advance, so that the service access process transmits the authentication request according to the authentication request addresses. The electronic device can implement various allocation schemes according to two factors of the service access process itself and the authentication request address upon determining the service key information allocated for the service access process.

For instance, the first allocation scheme is to allocate different service key information with respect to authentication request addresses sent by the different service access processes, and allocate different service key information with respect to different authentication request addresses sent by the same service access process. The security of this allocation scheme is higher than that of other allocation schemes, and the amount of allocated service key information is also larger, so the electronic device needs to consume more storage resources to store the allocated service key information.

The second allocation scheme is to allocate different service key information with respect to authentication request addresses sent by the different service access processes, and allocate same service key information with respect to different authentication request addresses sent by the same service access process, i.e., only distinguishing service access processes. The second allocation scheme requires less memory resources than the first allocation scheme.

The third allocation scheme is to allocate uniform service key information without distinguishing the service access processes and authentication request addresses, which requires minimal memory resources.

According to the requirements in practical application scenarios, any one of the above-mentioned three allocation schemes can be selected. For example, if an enterprise has the highest security requirement, the above-mentioned first allocation scheme can be selected. In this way, the flexibility in distributing service key information is enhanced.

In some embodiments, the above-mentioned determining service key information allocated for a service access process according to a synchronous verification processing result of the service access process can be realized in such a manner: determining service key information allocated for the service access process when a synchronous verification processing result of the service access process is verification success.

Here, service key information allocated for the service access process is determined when a synchronous verification processing result of the service access process is verification success; and when a synchronous verification processing result of the service access process is verification failure, the service access process is proved to be invalid, the service access process is refused to be allocated with service key information, and the communication connection with the service access process can also be disconnected. That is, the synchronous verification processing on the service access process may be essentially regarded as a preliminary verification of whether the service access process is valid.

In some embodiments, when the synchronous verification processing result of the service access process is verification failure, error information may be sent to the service access process to inform the service access process to resend the authentication request or to disconnect the communication connection with the service access process. In addition, if the synchronous verification processing result of the service access process is verification failure when the service access process is undergoing asynchronous verification processing, the asynchronous verification processing on the service access process may be interrupted to save computational resources.

Operation 104: Send the service key information to the service access process for encrypted service communication with the service access process based on the service key information.

The electronic device sends the service key information allocated for the service access process to the service access process, such that encrypted service communication with the service access process can be performed based on the service key information. For example, the service key information includes a symmetric key, then the service access process may encrypt the data according to the symmetric key, and send the encrypted data to the electronic device, so that the electronic device decrypts the received encrypted data according to the symmetric key; and likewise, the electronic device may encrypt the data according to the symmetric key and send the encrypted data to the service access process so that the service access process decrypts the encrypted data according to the symmetric key.

Operation 105: Control a communication connection used for bearing the encrypted service communication with the service access process according to an asynchronous verification processing result of the service access process.

When the asynchronous verification processing result of the service access process is obtained herein, a communication connection for carrying encrypted service communication with the service access process according to the asynchronous verification processing result. An embodiment does not limit the type of communication connection. The communication connection may be, for example, a socket connection.

In some embodiments, the above-mentioned controlling a communication connection for bearing encrypted service communication with the service access process according to the asynchronous verification processing result of the service access process can be realized in such a manner: maintaining the communication connection for bearing the encrypted service communication with the service access process when an asynchronous verification processing result of the service access process is verification success; and disconnecting the communication connection for bearing the encrypted service communication with the service access process when the asynchronous verification processing result of the service access process is verification failure.

Here, the communication connection for bearing the encrypted service communication with the service access process is continuously maintained when the asynchronous verification processing result of the service access process is verification success and the service access process is proved to be valid; and the communication connection for bearing the encrypted service communication with the service access process is disconnected to avoid damage to the service (for example, service data being stolen) when the asynchronous verification processing result of the service access process is verification failure, and the service access process is proved to be invalid. That is, the asynchronous verification processing on the service access process can be essentially regarded as a re-verification of whether the service access process is valid.

As shown in FIG. 4A, some embodiments can effectively verify the validity of the service access process by means of a combination of synchronous verification processing and asynchronous verification processing; and at the same time, encrypting the service communication through the service key information issued by the electronic device can reduce the probability that the service key information is stolen and used by a malicious process and improve the security of the service communication.

In some embodiments, referring to FIG. 4B, which is a flow chart of a service communication method, operation 102 shown in FIG. 4A may be implemented through operations 201 through 204, which will be described in connection with the operations.

Operation 201: Take a matching result between a process path of the service access process and a set security directory as a first verification processing result.

In some embodiments, the synchronous verification processing on the service access process may include verification processing on the process path and verification processing on signature information. For the former, the security directory can be pre-set according to practical application scenarios, the process path of the service access process is matched with the security directory, and the obtained matching result is taken as the first verification processing result. When the process path of the service access process is located in the security directory, the matching result between the process path and the security directory is determined to be successful, i.e., the first verification processing result is verification success; and when the process path of the service access process is not located in the security directory, it is proved that the service access process is invalid, and the matching result between the process path and the security directory is determined to be failed, i.e., the first verification processing result is verification failure.

Operation 202: Verify signature information about the service access process to obtain a second verification processing result.

Here, the signature information generally refers to information related to a digital signature of the service access process, and the specific content of the signature information which needs to be verified can be determined according to security requirements in practical application scenarios. The signature information about the service access process is verified to obtain the second verification processing result.

In some embodiments, the above-mentioned verifying signature information about the service access process to obtain a second verification processing result can be realized in such a manner: determining the second verification processing result according to at least one of a result of whether the signature information includes a digital signature, a validity verification processing result of the digital signature, a matching result between a signer and a signer blacklist of the digital signature, and a matching result between certificate information in the signature information and a certificate information blacklist.

Some embodiments provide four influencing factors for performing verification processing on the signature information about the service access process, which are respectively described below.

1) Whether the signature information includes the result of the digital signature. For example, when the signature information includes the digital signature, it is determined that the second verification processing result is verification success; and when the signature information does not include a digital signature, it is determined that the second verification processing result is verification failure.

2) The validity verification processing result obtained by performing validity verification processing on the digital signature in the signature information. For example, the validity verification processing result may be directly used as the second verification processing result, and the way of validity verification processing will be described later.

3) The matching result between the signer and the signer blacklist of the digital signature in the signature information. For example, the signer blacklist includes a plurality of malicious signers, and when the signer of the digital signature of the service access process is the same as any malicious signer in the signer blacklist, i.e., when the matching is successful, it is determined that the second verification processing result is verification failure; and when the signer of the digital signature of the service access process is different from all malicious signers in the signer blacklist, i.e., when the matching fails, it is determined that the second verification processing result is verification success.

4) The matching result between the certificate information in the signature information and the certificate information blacklist. The certificate refers to a digital certificate. For example, the certificate information blacklist includes a plurality of malicious certificate information, and when the certificate information about the service access process is the same as any one of the malicious certificate information in the certificate information blacklist, i.e., when the matching is successful, it is determined that the second verification processing result is verification failure; and when the certificate information of the service access process is different from all malicious certificate information in the certificate information blacklist, i.e., when the matching fails, it is determined that the second verification processing result is verification success. Here, the certificate information may be certificate chain information including, for example, root certificate information, intermediate certificate information and signature certificate information, and the format of the certificate information is determined according to the practical certificate issuance situation of the service access process.

The verification strength of the above-mentioned influencing factors 1) to 4) is increased progressively, and the verification duration is also increased progressively. At least one of the above-mentioned influencing factors can be selected for verification processing by integrating safety requirements and efficiency requirements in practical application scenarios. Taking the above-mentioned methods 1) and 2) as an example for illustration, when the signature information includes the digital signature and the validity verification processing result of the digital signature is verification success, it is determined that the second verification processing result is verification success; and when the signature information does not include the digital signature, or the validity verification processing result of the digital signature is verification failure, it is determined that the second verification processing result is verification failure. In this way, the flexibility in verifying the signature information of the service access process is improved.

In some embodiments, the following is further included: determining a digital signature in the signature information, and a decryption key corresponding to the digital signature; decrypting the digital signature according to the decryption key to obtain a first hash result of a process file of the service access process; performing hash processing on the process file of the service access process to obtain a second hash result; and taking a matching result between the first hash result and the second hash result as a validity verification processing result of the digital signature.

Here, an example of a validation process for a digital signature is provided. The digital signature may be obtained by performing hash processing on the process file of the service access process, and then encrypting the obtained first hash result, where the process file may be a transplantable and portable executable (PE) file of the service access process. Therefore, in performing the validity verification processing on the digital signature, a digital signature in signature information and a decryption key corresponding to the digital signature can be determined first, where the decryption key can be parsed from the certificate information about the service access process, such as a signature certificate.

Then, the digital signature is decrypted according to the decryption key to obtain the first hash result, and at the same time, hash processing is performed for the process file of the service access process to obtain the second hash result, where the algorithm used in the hash processing here may also be obtained from the certificate information, and in this way, it can be ensured that the algorithm used for calculating the first hash result is consistent with the algorithm used for calculating the second hash result. Finally, a matching result between the first hash result and the second hash result is taken as a validity verification processing result, for example, when the first hash result is the same as the second hash result, i.e., when the matching is successful, it is determined that the validity verification processing result is verification success; and when it is proved that the process file has been tampered when the first hash result is different from the second hash result, it is determined that the validity verification processing result is verification failure. Of course, the above-mentioned way is merely an example of the validity verification processing and does not constitute a limitation on the validity verification processing. For example, the validity verification processing may also be implemented by invoking a specific application program interface (API), such as WinVerifyTrust.

Operation 203: Determine a synchronous verification processing result of the service access process according to the first verification processing result and the second verification processing result.

For example, it is determined that the synchronous verification processing result of the service access process is verification success when the first verification processing result and the second verification processing result are both verification success; and it is determined that the synchronous verification processing result of the service access process is verification failure when any of the first verification processing result and the second verification processing result is verification failure. In this way, the synchronous verification processing on the service access process is performed by combining the process path and the signature information, and the accuracy of the obtained synchronous verification processing result can be effectively improved.

Operation 204: Periodically match process information about the service access process with a process information blacklist, and take the obtained matching result as an asynchronous verification processing result of the service access process.

Here, the process information may include at least one of an MD5 value of the process file, a Hash value of the process file, a process path, and certificate information, and may be set according to practical application scenarios. The process information blacklist includes process information about multiple malicious processes, which can be updated over time, similar to a virus library. In the process of performing asynchronous verification processing on the service access process, process information about the service access process can be periodically matched with the process information blacklist (for example, a current latest process information blacklist), and when the process information about the service access process is the same as any one of the process information in the process information blacklist, i.e., when the matching is successful, it is determined that the asynchronous verification processing result of the service access process is verification failure; and when the process information about the service access process is different from all the process information in the process information blacklist, i.e., when the matching fails, it is determined that the asynchronous verification processing result of the service access process is verification success.

In the case where the process information includes various types of contents (e.g. an MD5 value, a hash value, etc.), it may be set that when a certain content (e.g. the MD5 value) included in the process information A is the same as the same type of content included in the process information B, the process information A is determined to be the same as the process information B, thereby enhancing the efficiency of security management and control.

In addition, the process information about the service access process can be periodically sent to a specific cloud service, so that the cloud service matches the process information about the service access process with the process information blacklist, thereby relieving local processing pressure.

Figure 4B:
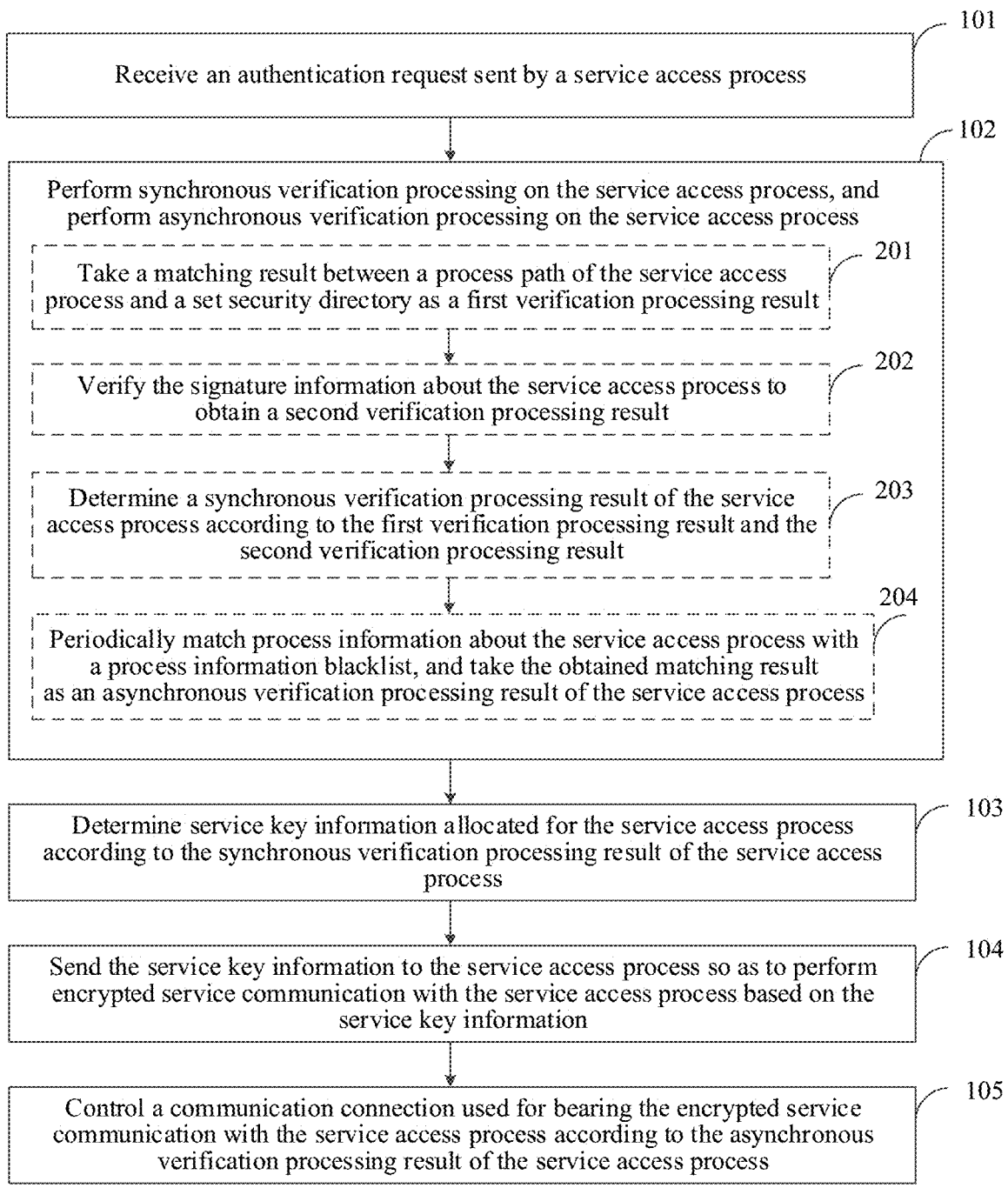
FIG. 4B is a flow chart of a service communication method according to some embodiments.

As shown in FIG. 4B, some embodiments provides some examples of performing synchronous verification processing and asynchronous verification processing on the service access process, which can effectively improve the accuracy of the obtained synchronous verification processing result and asynchronous verification processing result, thereby enhancing the security of subsequent service communication.

In some embodiments, referring to FIG. 4C, which is a flow chart of a service communication method, operation 104 shown in FIG. 4A may be implemented through operations 301 through 307, which will be described in connection with the operations.

Operation 301: Encrypt the service key information according to a public key in the authentication request.

In order to improve the security and confidentiality in the process of transmitting service key information, before operation 101, an asymmetric key pair may be generated by the service access process and the public key in the asymmetric key pair is added to the authentication request, where the asymmetric key pair includes the public key and the private key matched with the public key.

After determining the service key information allocated for the service access process, the electronic device may encrypt the service key information using the public key sent by the service access process.

Operation 302 Send the encrypted service key information to the service access process, so that the service access process decrypts the encrypted service key information according to a private key.

Here, the encrypted service key information is sent to the service access process, so that the service access process decrypts the encrypted service key information according to the stored private key. Since other processes except the service access process do not hold the private key, even if the encrypted service key information is stolen by other processes, other processes cannot obtain the actual service key information. In this way, the confidentiality of the service key information can be improved.

Operation 303: Receive a service request sent by the service access process. The service request includes a key identifier and request data encrypted using a symmetric key.

Here, taking the service key information including the key identifier and the symmetric key as an example, the process of encrypted service communication is illustrated. After receiving the service key information, the service access process may generate an invoking request based on the service key information, where the invoking request includes the key identifier and request data encrypted using the symmetric key, and the type of the request data is not limited here, and may be determined according to practical application scenarios.

A service interface (e.g. a specific port) may be predetermined in an electronic device, and when the electronic device receives an invoke request of the service access process to the service interface, the invoke request is taken as a service request. Different service interfaces may be set for a plurality of services, or uniform service interfaces may be set.

Operation 304: Query a symmetric key corresponding to the key identifier in the service request in the distributed symmetric key.

The electronic device stores the service key information while distributing the service key information, where each service key information includes one key identifier and a symmetric key corresponding to the key identifier. When receiving the service request sent by the service access process, the electronic device queries the symmetric key corresponding to the key identifier in the service request from all the allocated symmetric keys. If the symmetric key corresponding to the key identifier is not queried, corresponding error information can be sent to the service access process, so that the service access process resends the service request when receiving the error information.

In some embodiments, after operation 304, the following is further included: sending expired information to the service access process when a usage parameter of the queried symmetric key satisfies an expired parameter condition, so that the service access process resends an authentication request when receiving the expired information; where the usage parameter includes at least one of a usage number and a usage duration.

For the service key information, the expired parameter condition may be set, and when the usage parameter of a certain service key information satisfies the expired parameter condition, the electronic device can update the service key information, where the expired parameter condition may be at least one of the maximum number of uses and an effective usage duration, but may also be other conditions, which is not limited.

After querying according to the key identifier in the service request, if the usage parameter of the queried symmetric key (equivalent to the usage parameter of the service key information to which the symmetric key belongs) satisfies the expired parameter condition, the electronic device sends the expired information to the service access process, so that the service access process resends the authentication request when receiving the expired information, thereby requesting the updated service key information. In this way, dynamic updating of service key information can be realized to further improve the security of service communication.

Operation 305: Decrypt the encrypted request data in the service request according to the queried symmetric key.

Operation 306: Perform response processing on the request data obtained by the decryption to obtain response data.

Here, the response processing may be performed on the request data obtained by the decryption according to a practical service strategy or rule to obtain response data. For example, if the requested data acquired by the decryption process is a video link, the video data corresponding to the video link can be obtained as the response data. The response processing performed may be storing the request data obtained by the decryption, i.e., the response data is not necessarily obtained, and the case of obtaining the response data is only exemplified here.

In some embodiments, the service request further includes a time stamp and first checking information; where the first checking information is obtained by the service access process performing hash processing on the key identifier, the symmetric key, the time stamp and request data encrypted using the symmetric key; the response processing on the request data obtained by the decryption can be realized in such a manner: performing hash processing on the key identifier, the queried symmetric key, the time stamp and the encrypted request data to obtain second checking information; and when a matching result between the first checking information and the second checking information is matching success, performing the response processing on the request data obtained by the decryption.

Here, the service access process may perform hash processing on the key identifier, the symmetric key, a current time stamp and the request data encrypted using the symmetric key to obtain the first checking information, and add the first checking information to the service request herein, i.e., the service request includes the key identifier, the request data encrypted using the symmetric key, the time stamp and the first checking information. After obtaining a corresponding symmetric key through key identifier query in the service request, the electronic device performs the hash processing on the key identifier in the service request, the queried symmetric key, the queried symmetric key, the time stamp in the service request and the encrypted request data in the service request to obtain the second checking information. The algorithm used in the hash processing can be agreed in advance to ensure that the algorithm is unified.

When the first checking information is the same as the second checking information, i.e., when the matching is successful, it is proved that the data in the service request has not been tampered with, and at this moment, the electronic device performs response processing on the request data obtained by the decryption; when the first checking information is different from the second checking information, i.e., when the matching fails, it is proved that the data in the service request has been tampered with, and the electronic device can send corresponding error information to the service access process, so that the service access process resends the service request when receiving the error information. In some embodiments, the first checking information and the second checking information may be compared first, and then the encrypted request data in the service request is decrypted according to the queried symmetric key; and it is also possible to decrypt the encrypted request data in the service request first according to the queried symmetric key, and then compare the first checking information with the second checking information. In this way, it is possible to accurately determine whether the data in the service request has been tampered with, thereby determining whether to perform the response processing.

Operation 307: Encrypt the response data according to the public key, and send the encrypted response data to the service access process, so that the service access process decrypts the encrypted response data according to the private key.

After obtaining response data through the response processing, the electronic device encrypts the response data according to the public key sent by the service access process, and sends the encrypted response data to the service access process. In this way, when receiving the encrypted response data, the service access process can decrypt the same according to the stored private key to obtain the response data and complete an encrypted service communication.

Figure 4C:
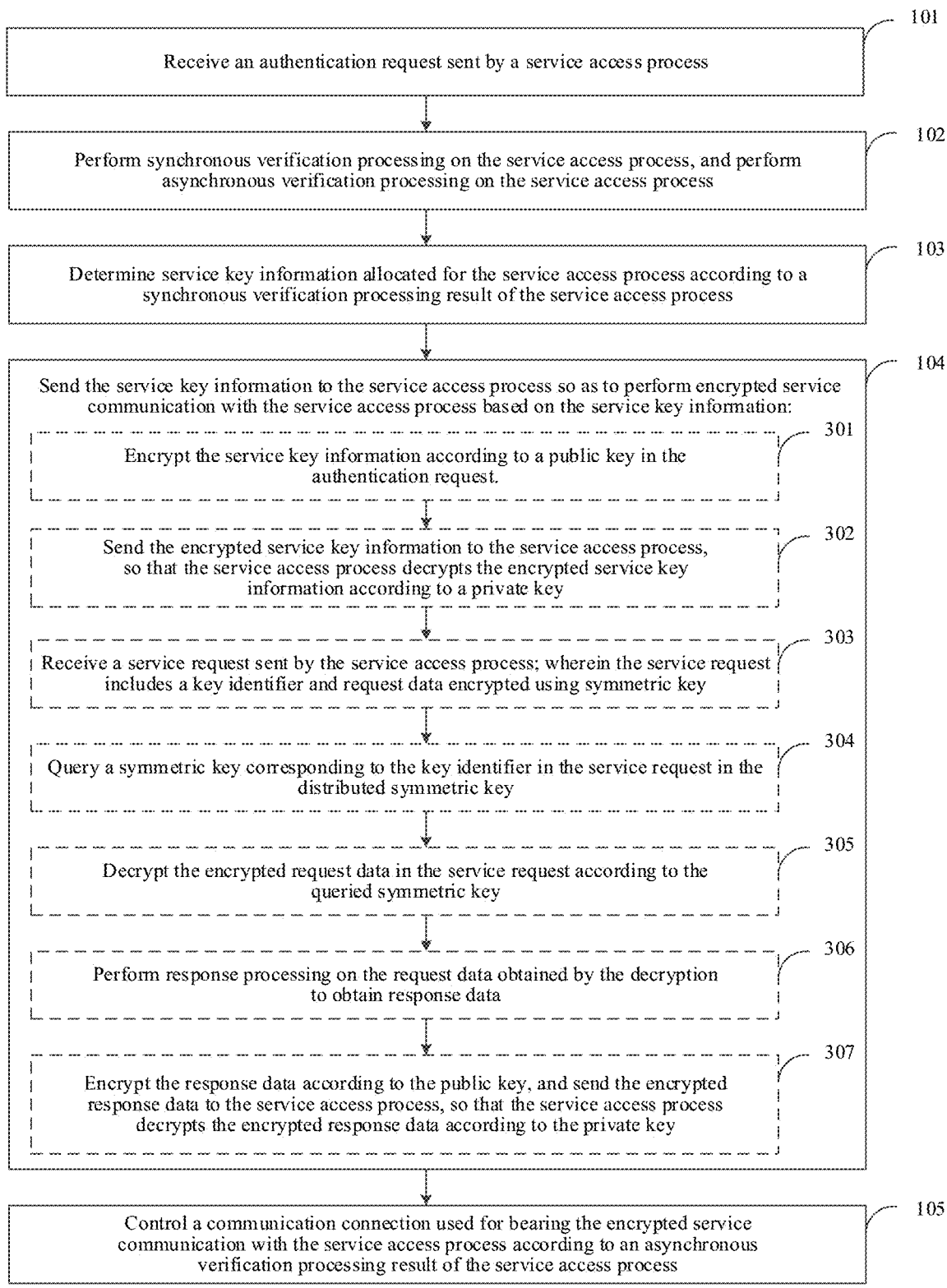
FIG. 4C is a flow chart of a service communication method according to some embodiments.

As shown in FIG. 4C, according to some embodiments, the encrypted service communication is performed by combining the asymmetric key pair generated by the service access process and the service key information issued by the electronic device, so that the security and privacy of the service communication can be effectively guaranteed.

Figure 4D:
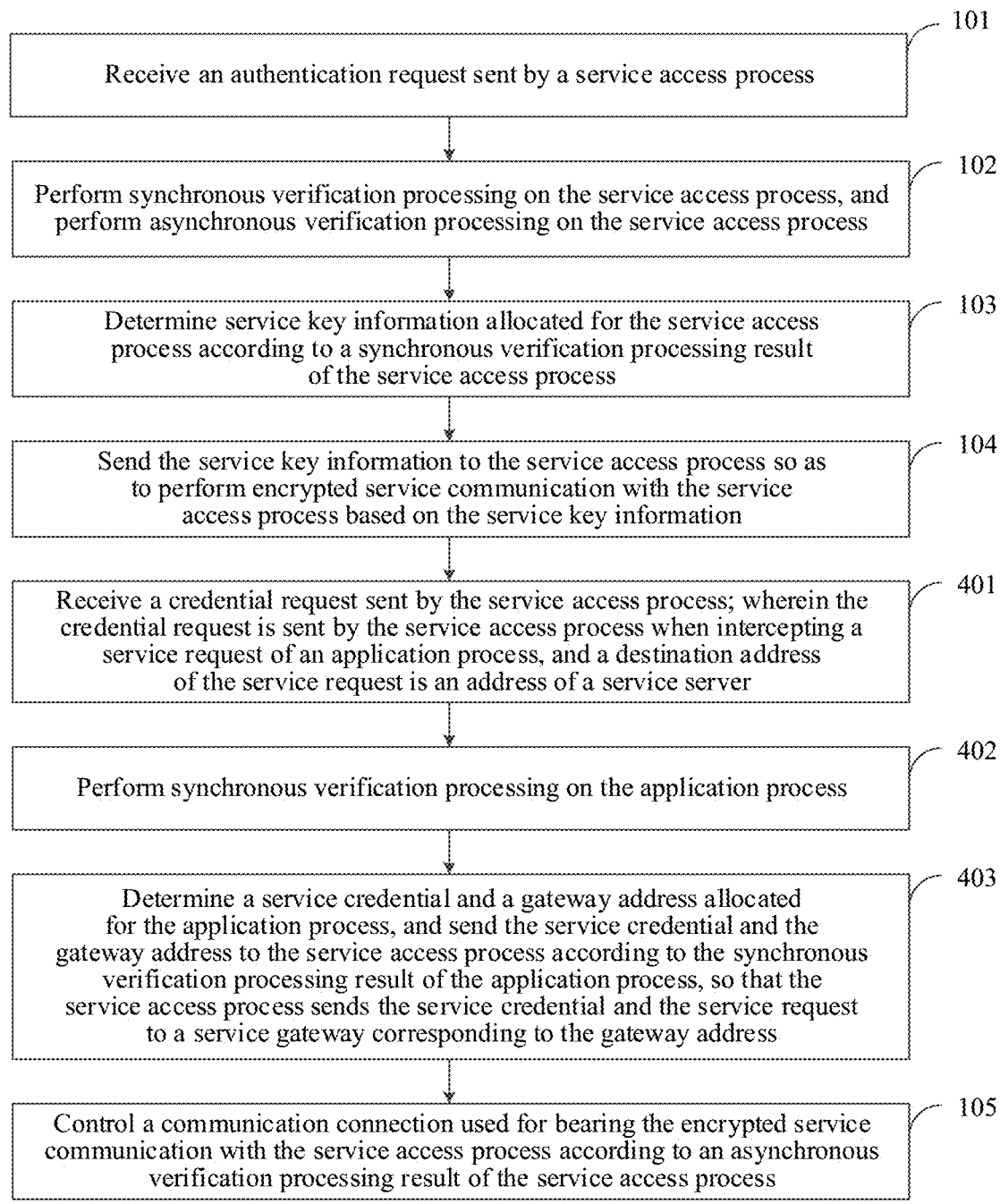
FIG. 4D is a flow chart of a service communication method according to some embodiments.

In some embodiments, referring to FIG. 4D, which is a flow chart of a service communication method, and after operation 104 shown in FIG. 4A, a credential request sent by the service access process may also be received operation 401; where the credential request is sent by the service access process in response to intercepting a service request of an application process, and a destination address of the service request is an address of a service server.

In some embodiments, the service access process may be used for intercepting the service request sent by the application process (for example, an application process running on the same terminal device as the service access process), where the destination address of the service request is the address of the service server, and the address here may include an Internet Protocol (IP) address (or a domain name) and a port. The way the service request is intercepted is not limited here, and the interception may be achieved by a specific virtual network card, for example.

When the service request is intercepted, the service access process generates the credential request, and the content of the credential request may include a source address (i.e., the address of the application process) and a destination address in the service request, and may also include a process identification (PID) of the application process.

Operation 402: Perform synchronous verification processing on an application process.

when receiving the credential request sent by the service access process, an electronic device performs the synchronous verification processing on the application process to which the credential request is directed. Essentially, the credential request is also one of the service requests sent by the service access process, and the response data requested by the credential request is a service credential.

In some embodiments, the above-mentioned synchronous verification processing on the application process can also be realized in such a manner: determining a user account in a login state in a device where the application process is located, and acquiring process information about a trusted application process corresponding to the user account and an address of an accessible service server corresponding to the user account; taking a matching result between process information about the application process and process information about the trusted application process as a third verification processing result; taking a matching result between the address of the service server requested by the service request and the address of the accessible service server as a fourth verification processing result; acquiring device information about the device where the application process is located, and taking a matching result between the device information and device security conditions as a fifth verification processing result; and determining a synchronous verification processing result of the application process according to the third verification processing result, the fourth verification processing result and the fifth verification processing result.

Here, an example of a synchronous verification processing on an application process is provided. First, according to practical application scenarios, for each of a plurality of user accounts, trusted application process corresponding to the user account and the accessible service server may be set, and the electronic device may store the process information about the trusted application process and the address of the accessible service server locally.

When receiving the credential request sent by the service access process, the electronic device may determine a corresponding application process according to the PID in the credential request, determine a user account in a login state in the device where the application process is located, and at the same time acquire the device information about the device where the application process is located. For the user account in a login state, when the process information about the application process is the same as the process information about any one of trusted application processes corresponding to the user account, i.e., when the matching is successful, it is determined that the third verification processing result is verification success; and when the process information about the application process is different from the process information about all the trusted application processes corresponding to the user account, it is determined that the third verification processing result is verification failure. Also, for the user account in a login state, when the destination address in the credential request is the same as the address of any accessible service server corresponding to the user account, i.e., when the matching is successful, it is determined that the fourth verification processing result is verification success; and when the destination address in the credential request is different from the addresses of all the accessible service servers corresponding to the user account, it is determined that the fourth verification processing result is verification failure.

In addition, the device information is matched with the set device security conditions, and if the device information meets the device security conditions, i.e., when the matching is successful, then it is determined that the fifth verification processing result is verification success; and otherwise, it is determined that the fifth verification processing result is verification failure. Here, the device security conditions are not limited, and for example, viruses and system holes may not be included in the device information.

At last, it is determined that a synchronous verification processing result of the application process is verification success when the third verification processing result, the fourth verification processing result and the fifth verification processing result are verification success; and when any one of the third verification processing result, the fourth verification processing result and the fifth verification processing result is verification failure, it is determined that the synchronous verification processing result of the application process is verification failure. It is also possible to determine the synchronous verification processing result of the application process based on at least one of the above-mentioned third verification processing result, fourth verification processing result and fifth verification processing result, thereby improving the efficiency of the synchronous verification processing. In this way, the accuracy and effectiveness of the obtained synchronous verification processing result can be improved.

In some embodiments, after operation 401, the following is further included: periodically matching the process information about the application process with a process information blacklist, and taking the obtained matching result as an asynchronous verification processing result of the application process; and controlling a communication connection used for bearing the encrypted service communication with the service access process according to an asynchronous verification processing result of the application process.

In addition to performing the synchronous authentication processing on the application process, asynchronous verification processing may be performed on application processes. Here, the process of performing asynchronous verification processing on the application process is similar to the process of performing asynchronous verification processing on the service access process described above. After obtaining an asynchronous verification processing result of the application process, if the asynchronous verification processing result is verification success, the communication connection with the service access process is maintained; and if the asynchronous verification processing result is verification failure, the communication connection with the service access process is disconnected.

In some embodiments, between any of the operations, the following is further included: sending a query request to a blockchain network to query the blacklist stored in the blockchain.

Some embodiments may also be implemented in conjunction with blockchain techniques. In some embodiments, the blockchain may be used to store the blacklist, including, but not limited to, the signer blacklist, certificate information blacklist, and process information blacklist described above. Some embodiments of a blockchain network are illustrated by an example in which an electronic device accesses the blockchain network to implement blacklist query below.

To facilitate understanding, illustrated with the architecture shown in FIG. 2, the electronic device 700 accesses the blockchain network 500 as a client node of the blockchain network 500. The electronic device 700 sends a query request to the blockchain network 500 in the form of a transaction when a blacklist needs to be queried, where an intelligent contract to be invoked for implementing a query operation and parameters to be passed to the intelligent contract are specified in the transaction, and the transaction also carries a digital signature signed by the electronic device 700 (for example, obtained by encrypting an abstract of the transaction via a digital certificate of the electronic device 700), and broadcasts the transaction to the blockchain network 500. The digital certificate may be registered by the electronic device 700 with the authentication center 600.

After receiving the transaction, a node 510 in the blockchain network 500 performs verification on the digital signature carried in the transaction. After the digital signature is verified successfully, according to an identifier of the electronic device 700 carried in the transaction, it is determined whether the electronic device 700 has a transaction permission. The transaction fails if either of the digital signature verification and the permission verification fails. Upon verification success, the node 510 signs its own digital signature and continues to broadcast in the blockchain network 500.

After a node 510 with the sorting function in the blockchain network 500 receives the successfully verified transaction, the transaction is filled into a new block and broadcast to nodes that provide the consensus service in the blockchain network 500.

The node 510 providing the consensus service in the blockchain network 500 performs a consensus process on a new block to reach a consensus, and a node 510 providing an account book function appends the new block to the tail of the blockchain, and executes a transaction in the new block: for transactions that query the blacklist, the blacklist is queried from the state database and the queried blacklist is sent to the electronic device 700. The state database stores data in the form of a key value pair, and the data stored in the state database is generally the same as the data stored in the blockchain, and when responding to a query transaction, a response may be preferentially performed according to the data in the state database, thereby improving the response efficiency. Of course, in the absence of the state database, a response may be made directly from the data in the blockchain. Since the data in the blockchain has the property of being non-tamperable, the accuracy of the acquired blacklist is ensured in this way. In addition, the data stored in the blockchain is not limited to a blacklist, and may further include, for example, the allocated service key information, the process information about the trusted application process corresponding to the user account, the address of the accessible service server corresponding to the user account, etc.

Operation 403: According to a synchronous verification processing result of the application process, determine a service credential and a gateway address allocated for the application process, and send the service credential and the gateway address to the service access process, so that the service access process sends the service credential and the service request to a service gateway corresponding to the gateway address.

For example, when the synchronous verification processing result of the application process is verification success, the electronic device determines the service credential and the gateway address allocated for the application process, and sends the service credential and the gateway address to the service access process; and when the synchronous verification processing result of the application process is verification failure, the communication connection with the service access process may be disconnected, or the service access process may be notified to directly connect with the service server. The gateway address here refers to an address of a service gateway having authority to access the service server (hereinafter referred to as a service server requested by the service request of the application process). In some embodiments, different service gateways having authority to access may be set for different service servers, and the service gateways having authority to access may also be set uniformly, which is not limited. The electronic device may store the assigned service credential locally for subsequent authentication, where the type of service credential is not limited and may be, for example, a random string.

When receiving the service credential and the gateway address, the service access process may first send the service credential to the service gateway corresponding to the gateway address. When receiving the service credential, the service gateway sends the service credential to the electronic device for verification processing, and if the service credential is the same as the service credential stored in the electronic device, i.e., the verification is successful, the service gateway can send information that the verification is successful to the service access process. When receiving the information that the verification is successful, the service access process sends the service request of the application process to the service gateway, so that the service gateway forwards the service request to the service server, and thus the service server can perform respond processing on the request data in the received service request. The response data obtained by the response processing of the service server can be sent to the application process in the opposite communication direction. Furthermore, if the service gateway fails to verify the received service credential, the service gateway does not support forwarding the service request sent by the service access process, for example, the service gateway may disconnect the communication connection with the service access process.

In the above-mentioned operations 401 to 403, the interaction between the service access process and the electronic device falls within the category of the encrypted service communication.

As shown in FIG. 4D, the service access process may act as a proxy for the application process, enabling the access to the service server, and is applicable to a zero-trust scenario, such as a scenario of zero-trust borderless office.

Figure 4E:
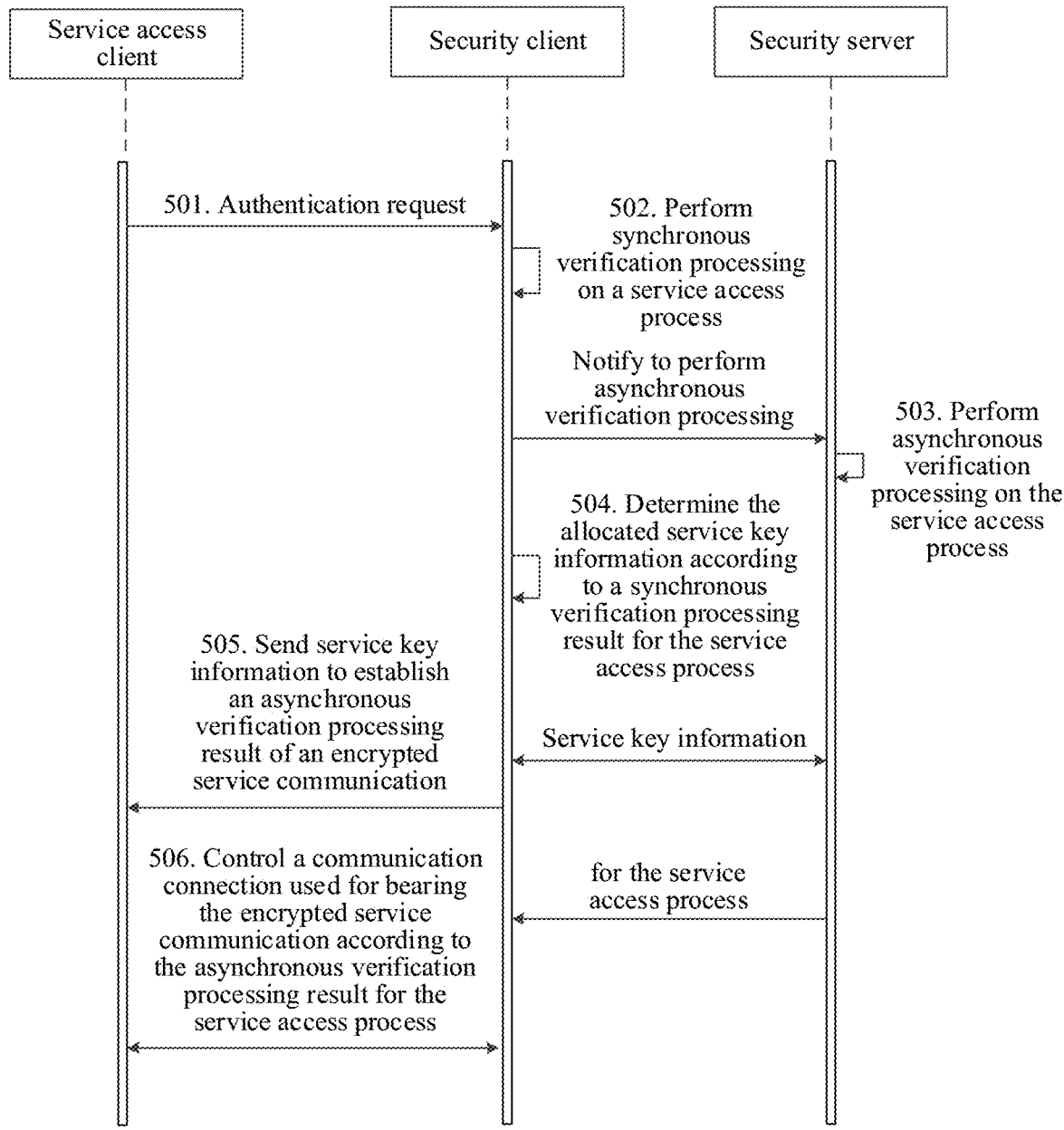
FIG. 4E is a flow chart of a service communication method according to some embodiments.

In some embodiments, a service communication method may be implemented by a service communication system including a service access client, a security client, and a security server. FIG. 4E is a flow chart of the service communication method according to some embodiments. The method will be described in conjunction with the operations shown in FIG. 4E.

Operation 501: Receive, by the security client, an authentication request sent by the service access process.

Here, the security client and the service access client may be deployed in the same terminal device or in different terminal devices.

Operation 502: Perform, by the security client, synchronous verification processing on the service access process.

Here, the synchronous verification processing on the service access process may include verification processing on a process path and signature information. In some embodiments, the service access client may be a component of the security client, and a security directory may be an installation directory of the security client when the security client performs verification processing on the process path of the service access process.

Operation 503: Perform, by the security server, asynchronous verification processing on the service access process.

Here, the security client may notify the security server of asynchronous verification processing on the service access process, and the security server may return an asynchronous verification processing result of the service access process to the security client. The security client may send process information about the service access process to the security server to facilitate the asynchronous verification processing.

Operation 504: Determine, by the security client, service key information allocated for the service access process according to a synchronous verification processing result of the service access process.

For example, when the synchronous verification processing result of the service access process is verification success, the security client requests the service key information from the security server, i.e., a practical generator of the service key information may be the security server. The security client may store the acquired service key information locally for subsequent encrypted service communication.

Operation 505: Send, by the security client, the service key information to the service access process for encrypted service communication with the service access process based on the service key information.

In some embodiments, after operation 505, the following is further included: receiving, by the security client, a credential request sent by the service access process; where the credential request is sent by the service access process when intercepting a service request of an application process, and a destination address of the service request is an address of a service server; notifying, by the security client, the security server to perform synchronous verification processing on the application process; determining, by the security server, a service credential and a gateway address allocated for the application process according to a synchronous verification processing result of the application process, and sending the service credential and the gateway address to the service access process via the security client; sending, by the service access client, the service credential and the service request to a service gateway corresponding to the gateway address through the service access process; where the service gateway is configured to perform verification processing on the received service credential, and send the received service request to the service server when the verification processing result of the service credential is verification success; and the service server is configured to perform response processing on the request data in the received service request.

For example, the security client, the service access process, and the application process may run in the same terminal device. The security client may send the acquired credential request, a user account in a login state in a device where the application process is located, process information about the application process and device information about the device where the application process is located to the security server, so that the security server performs the synchronous verification processing on the application process, where the user account in a login state can refer to the user account in a login state in the security client.

In some embodiments, the security server may also perform the asynchronous verification processing on the application process.

Operation 506: Control, by the security client, a communication connection for bearing encrypted service communication with the service access process according to an asynchronous verification processing result of the security server for the service access process.

As shown in FIG. 4E, according to some embodiments, the encrypted service communication may be implemented through the service access client, the security client, and the security server, where the service access client may be used as a component of the security client, facilitating the installation into a terminal device (for example, a terminal device held by an enterprise employee), and is applicable to a scenario of zero-trust borderless office, etc.

In some embodiments in a practical application scenario will be described below, a scenario of zero-trust borderless office is illustrated for ease of understanding, where zero trust refers to not trusting any user/device/application inside and outside the network. In some embodiments, the service communication system may include the security client, the security server, and a security manager, where the security manager is configured to configure policies, rules and the like applied in the security client and/or the security server, and the security manager may provide a human-computer interaction interface (such as a Web interface) to facilitate the configuration by an administrator (such as an enterprise administrator).

For example, the administrator may configure a zero-trust strategy on the security manager, where the zero-trust strategy includes applications (trusted applications) that a user account can use and service systems that can be accessed. By way of example, reference is made to a schematic diagram of the strategy management interface of the security manager shown in FIG. 5. In FIG. 5, the zero-trust strategy may be configured from three aspects of the user account (or a user account group), the trusted application and the service system (corresponding to the above-mentioned service server) in an organizational architecture, which are respectively described below.

1) User account or user account group: in some embodiments, the granularity of the zero-trust strategy may be a single user account. If a zero-trust strategy is configured for a certain user account group, all user accounts included in the user account group may share the same zero-trust strategy.

2) Trusted applications: the terminal device can access an application bearer of the internal service system, and the application bearer is trusted by the security manager. In an embodiment of this application, the process information of the application process may include an application name, a process name, an application MD5 value and signature information, etc.

3) Service system: it can be used to provide service resources, data, development environment, test environment, operation and maintenance environment, formal production environment and the like inside an enterprise and is an object to be accessed by an access subject (person/terminal device/application), i.e., the service system is an access object. In some cases, the service system may be a service server (or a cluster of service servers).

The user account group is a node in an enterprise organization architecture, and in FIG. 5, the nodes are a network-wide account, the user account group and the user account in sequence from top to bottom. That is, the network-wide account is a parent node of all the user account groups, and the user account group is a parent node of all the user accounts included in the user account group. For instance, the "lemon" user account in FIG. 5 belongs to a "testgroup" user account group, and the "testgroup" user account group belongs to the network-wide account.

Some embodiments also provide a schematic diagram of process information (also referred to as process characteristics) as shown in FIG. 6. In FIG. 6, process information about a conference application process is shown, which may include a process name, an application name, an operating system (i.e., an operating system of a terminal device for running the application process), a manufacturer, signature information, a test result (i.e., an asynchronous verification processing result), a version, an MD5 value and an SHA256.

Before configuring the service system, the administrator may perform relevant configuration of a zero-trust gateway on a zero-trust gateway (corresponding to the above-mentioned service gateway) interface of the security manager. As an example, a schematic diagram of a zero-trust gateway interface of a security manager as shown in FIG. 7 and a schematic diagram of a configuration interface of a zero-trust gateway as shown in FIG. 8 are provided. The configuration interface shown in FIG. 8 may be displayed by triggering a certain gateway (such as a gateway 4) shown in FIG. 7, which is not limited. The administrator may configure the attributes of the zero-trust gateway, such as a name, an IP address, a domain name, a port, and a priority access IP address segment, according to actual needs. If the priority access IP address segment is configured for a certain gateway, when the IP address of the access subject (such as a certain terminal device) matches successfully with the priority access IP address segment (i.e., falling into the priority access IP address segment), the gateway can be preferentially used to forward a service request of the access subject; and when the IP address of the access subject fails to match the priority access IP address segment, the gateway may be selected to be used or not, depending on the practical application scenarios.

Some embodiments also provide a schematic diagram of a service system interface of a security manager as shown in FIG. 9. In FIG. 9, a particular service system may be queried, and addition, copy, and deletion (e.g. deletion in batches) of a service system may also be supported. Depending on the practical application scenarios, different system combinations may also be created, where the system combination includes at least one service system. In FIG. 9, the service systems 1 to 4 in system combination 1 are shown by taking the system combination 1 as an example.

Figure 11:
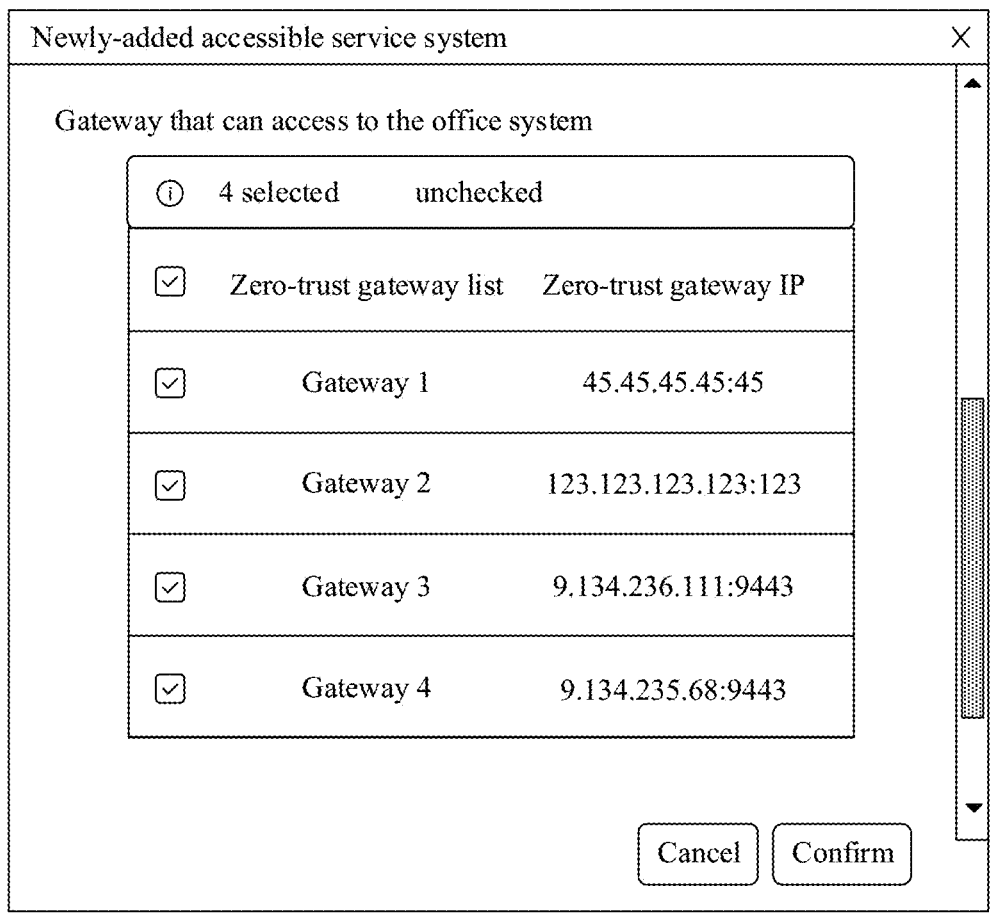
FIG. 11 is a schematic diagram of a configuration interface of a service system according to some embodiments.
Figure 12:
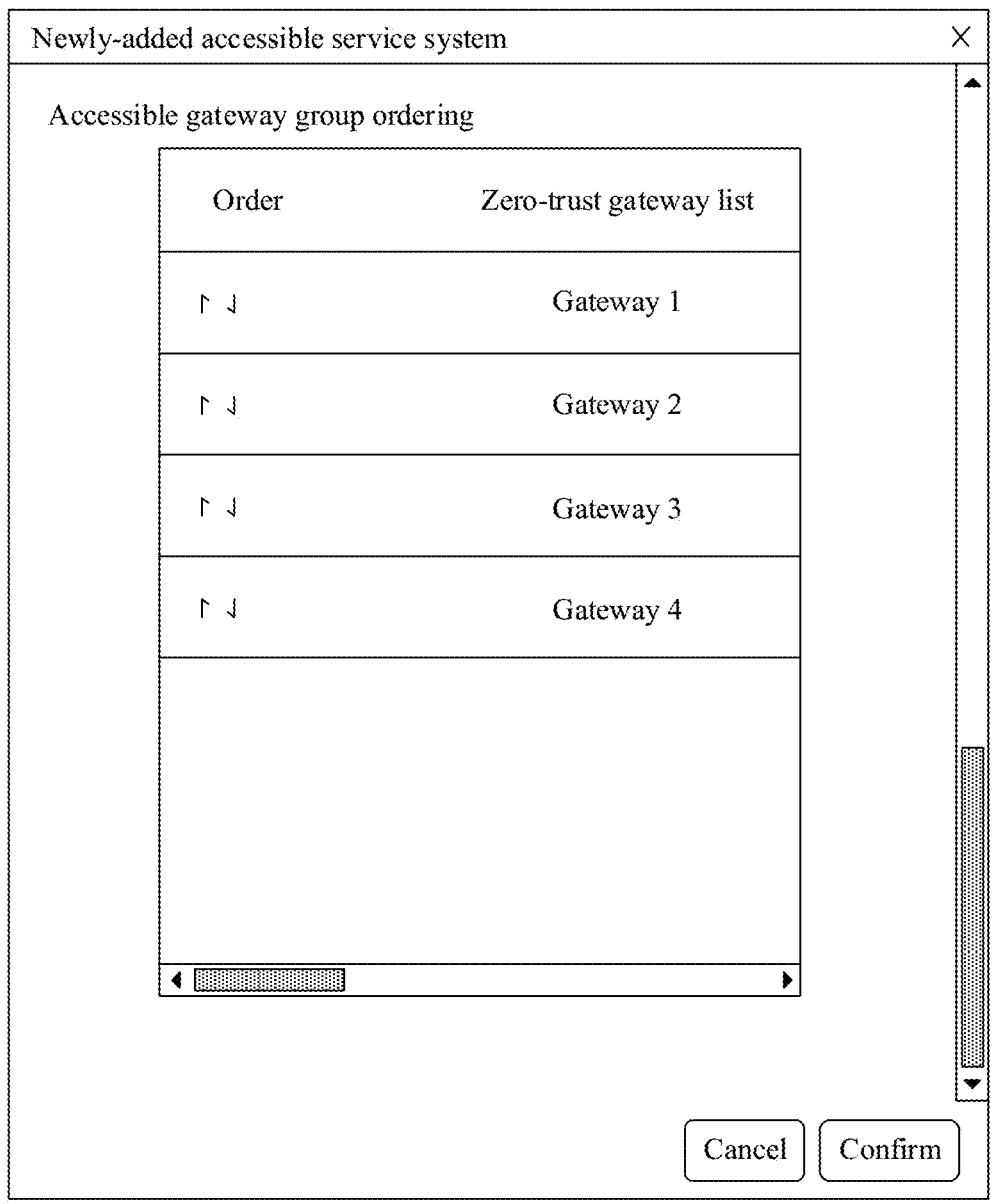
FIG. 12 is a schematic diagram of a configuration interface of a service system according to some embodiments.

As an example, some embodiments also provide a schematic diagram of a configuration interface of the service system as shown in FIGS. 10, 11 and 12. For each service system, an IP address thereof, an IP address segment thereof, a domain name and a port thereof may be configured, and a gateway (i.e., a gateway having access permission) which can access the service system can also be configured according to practical service conditions, and the order of a plurality of gateways which can access the service system can be user-defined. For instance, for 4 gateways which can access a certain service system, the gateways are gateway 1, gateway 2, gateway 3 and gateway 4 in the order from the front to the back, then when accessing the service system, the access subject also accesses in turn according to the order, for example, accessing gateway 1 first, accessing gateway 2 if the access fails, and so on.

Figures 13, 14:
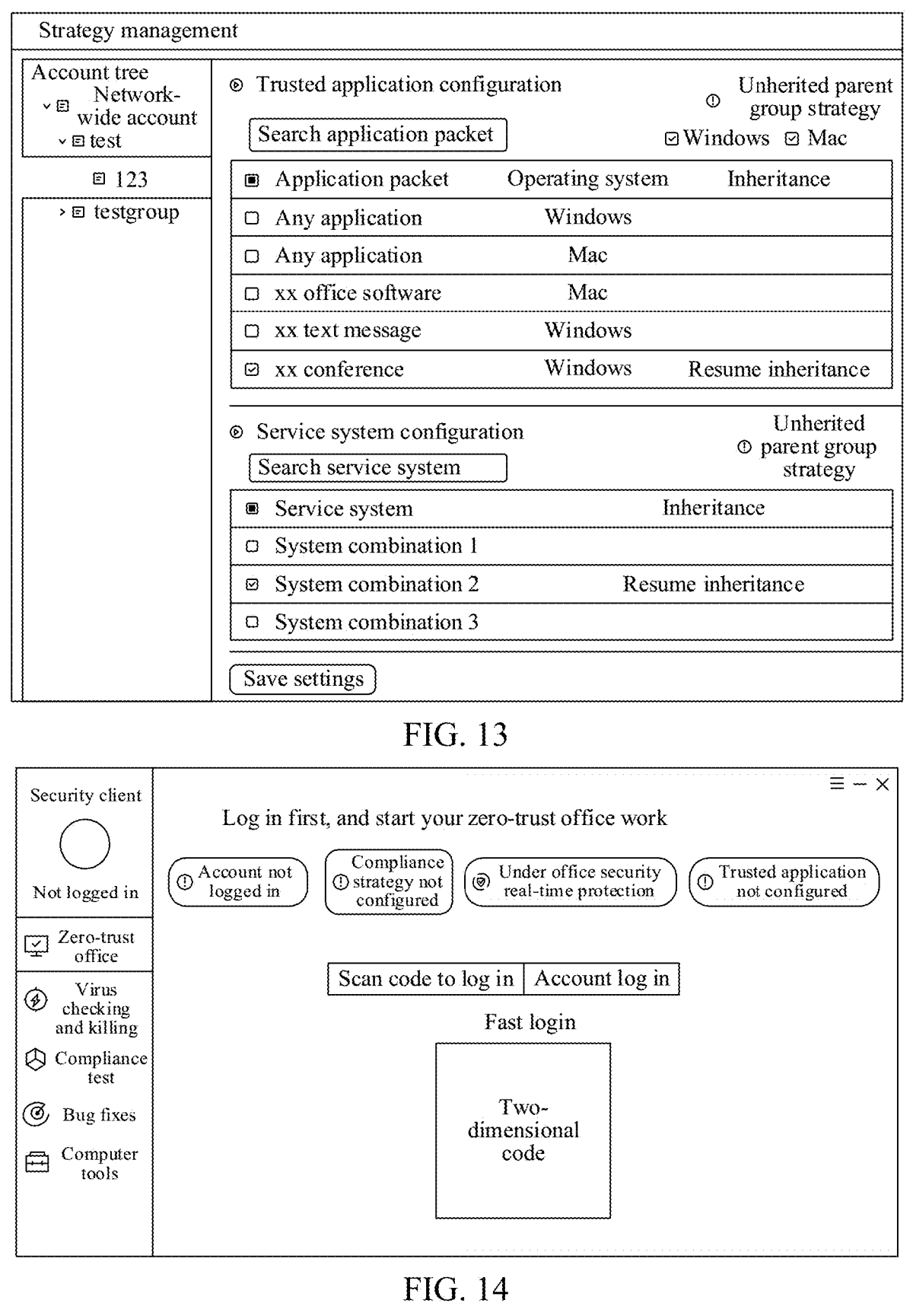

After the configuration of the service system and the trusted application is completed, a relevant configuration may be issued for the user account or the user account group, i.e., the zero-trust strategy is issued. As an example, some embodiments provide a schematic diagram of a strategy management interface of a security manager as shown in FIG. 13. In FIG. 13, a trusted application (i.e., "xx conference" in FIG. 13) and a service system (i.e., "system combination 2" in FIG. 13) accessible via the trusted application are configured for a user account "123". Some embodiments may provide an inheritance function, i.e., automatically copying the configuration down with the user account hierarchy from top to bottom, avoiding repeated checking operations by the administrator. For example, if the user account "123" belongs to a user account group "test", the configuration of the user account group "test" may be copied to the user account "123". Of course, the inheritance function may also be turned off for targeted configuration of the user account "123".

Figure 15:
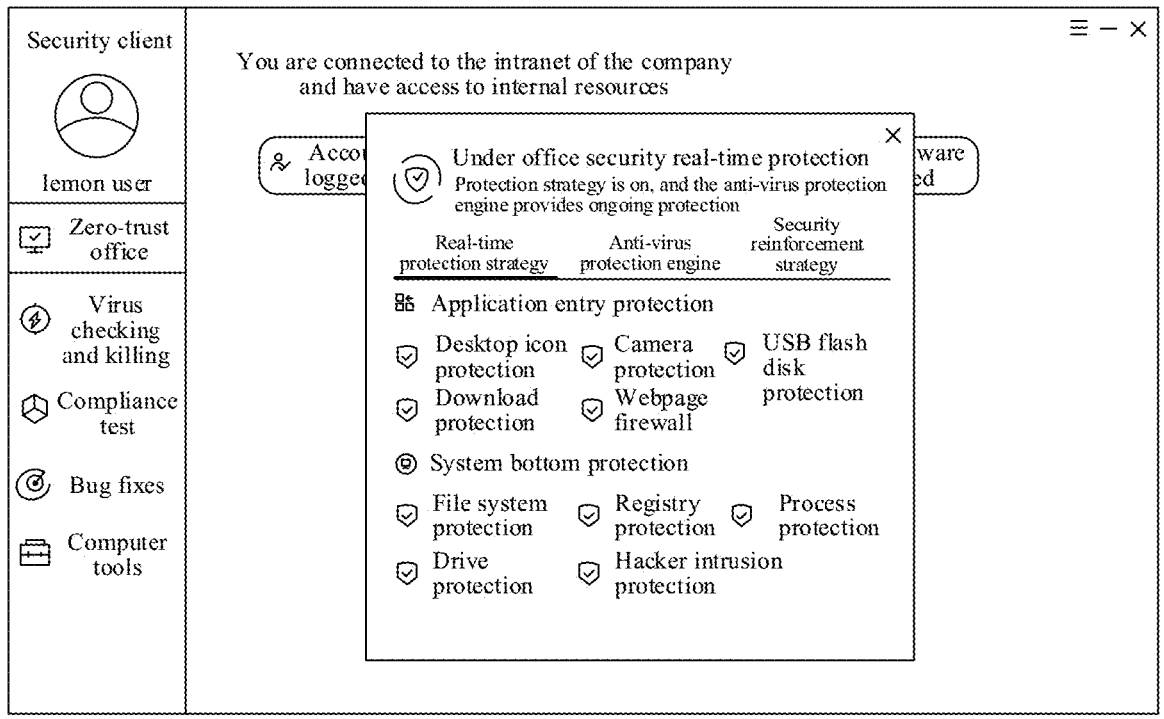
FIG. 15 is a schematic diagram of a security client interface according to some embodiments.

The security manager may deploy the zero-trust strategy configured by the administrator into the security server, and may also deploy into the security client, for example, deploy a part of the zero-trust strategy into the security client. The security client is for installation into a terminal device as the access subject, such as a personal computer used by an employee of an enterprise, etc. As an example, some embodiments provide an interface schematic diagram of a security client as shown in FIG. 14. In FIG. 14, two modes of scan code login and account login are provided, where the account login refers to login by inputting a user name and a password. The security client may also integrate the functions of virus checking and killing, compliance detection, vulnerability repair and computer tools. For another example, as shown in FIG. 15, after successful login, the security client can provide a real-time protection strategy, an anti-virus protection engine and a security reinforcement strategy, and can add and delete the functions of the security client according to practical application scenarios.

Figure 16:
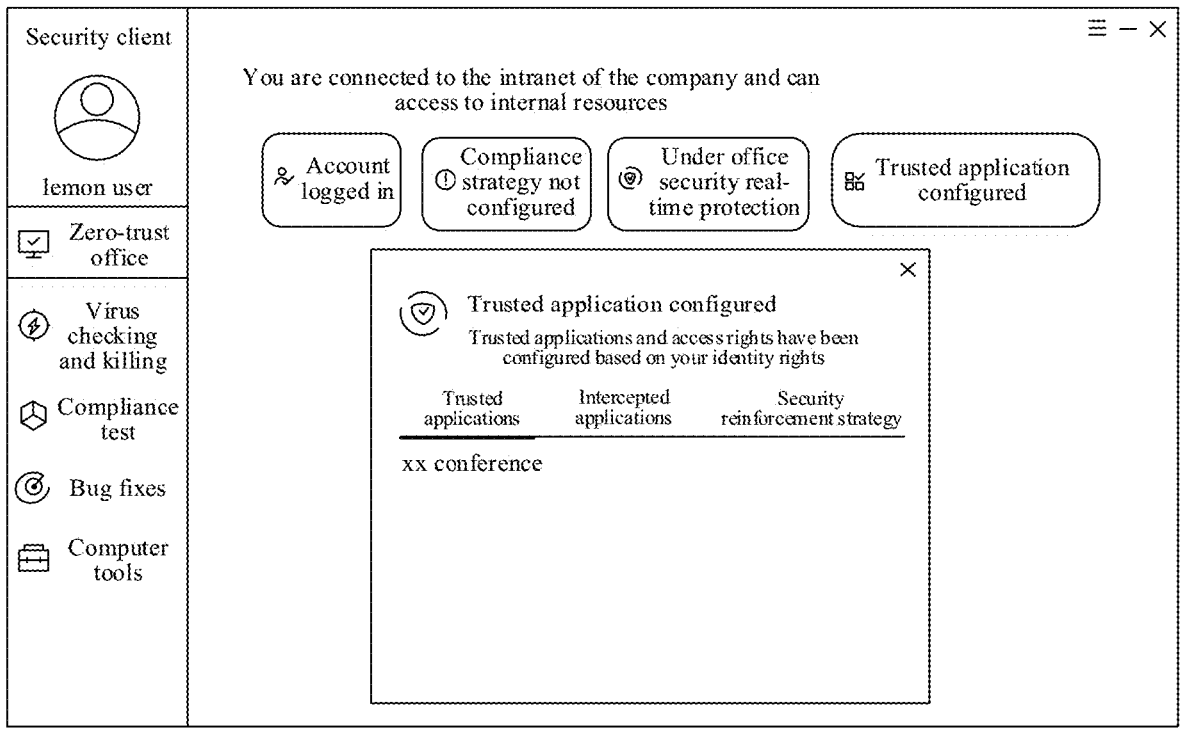
FIG. 16 is a schematic diagram of a security client interface according to some embodiments.

Some embodiments also provide an interface schematic diagram of a security client as shown in FIG. 16, and after login, the security client can acquire a zero-trust strategy configured for a user account in a login state, and acquire a trusted application from the zero-trust strategy and display same. For example, in FIG. 16, the trusted application "xx conference" corresponding to the user account "lemon" is shown. According to the zero-trust strategy issued by the security manager, the terminal device can access the configured service system according to the configured trusted application, which is applicable to the borderless office scenario, such as remote office.

Figure 17:
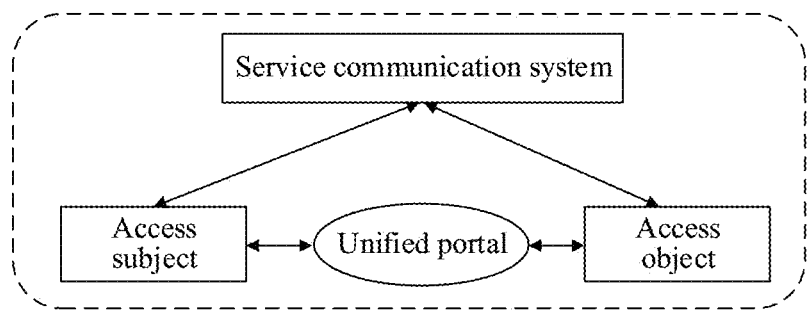
FIG. 17 is a schematic diagram of an access process according to some embodiments.

Next, taking the borderless office scenario as an example, an actual access process is described. Some embodiments provide an access process schematic diagram as shown in FIG. 17. In FIG. 17, the service communication system can serve as a zero-trust network security service provider, and provides a unified portal for the access subject based on an access proxy (corresponding to the above-mentioned service access client) and the zero-trust gateway, so that the access subject accesses the access object through the unified portal, i.e., a service request is sent through a network. The service communication system may provide an authentication operation for the unified portal, and only the service request passing the authentication can be forwarded to the zero-trust gateway by the access proxy to access the actual service system via the zero-trust gateway proxy.

Figure 18:
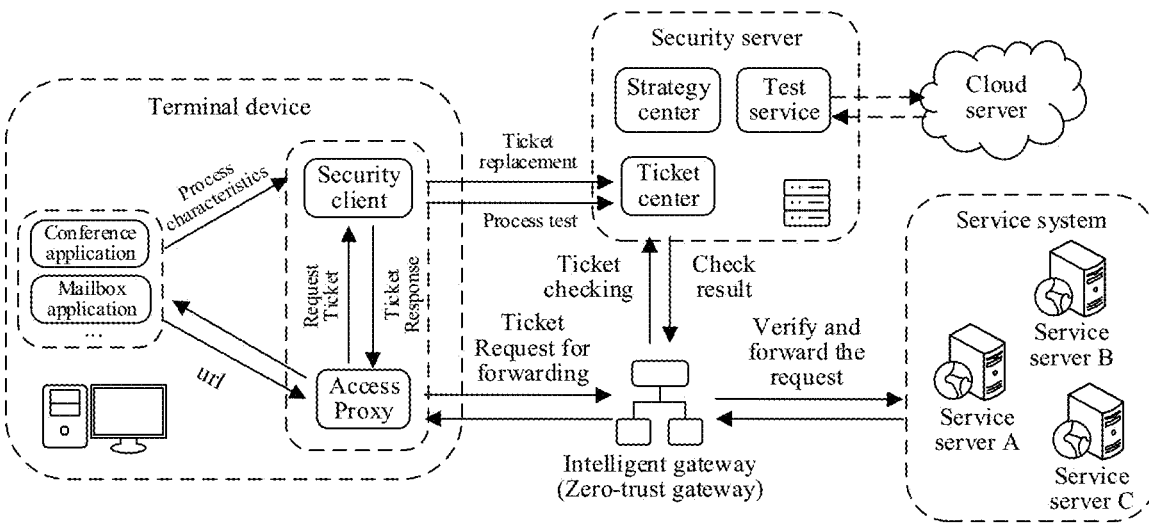
FIG. 18 is a schematic diagram of an access process according to some embodiments.

As an example, some embodiments also provide a schematic diagram of an access process as shown in FIG. 18. Core modules in FIG. 18 include the security client, the security server, the access proxy and the zero-trust gateway (intelligent gateway), which are respectively described next.

1) Security client: An agent installed in the access subject (such as a terminal device of an enterprise employee) can be used to verify whether a user account in a login state is trusted, whether a terminal device is trusted and whether an application is trusted. The security client can send process characteristics (corresponding to the process information above) of the application process to the security server, i.e., performing process test (corresponding to the asynchronous verification processing on the application process above).

2) Access proxy: it is also known as a proxy client configured to hijack traffic of the terminal device, i.e., intercept the service request sent by the application process in the terminal device, where the hijacking of the traffic may be implemented via a Tunnel/Tap (TUN/TAP) virtual network card, but the way of hijacking is not limited thereto.

3) Zero-trust gateway: it may be deployed at portals for enterprise applications and data resources to verify, authorize, and forward each service request for access to the enterprise's internal service system. The zero-trust gateway may be constructed in software.

4) Security server: it is responsible for performing secure scheduling on service traffic through a strategy control engine (a strategy center), and authorizing the service request of the application process according to the granularity of user account number-terminal device-application. The security server may be configured to verify whether a user account in a login state in the security client is trusted, may also be configured to verify device hardware information and device security state, and may also be configured to detect whether an application process is trusted, such as whether there is a vulnerability, and whether there is a virus Trojan, etc. The security server may periodically initiate file test to a cloud server, and if the application process sending the service request is identified as a malicious process, the security client is notified to execute an asynchronous blocking operation, for example, a communication connection with the access proxy is disconnected, where the cloud server is configured to provide a cloud detection service (or known as a cloud query service, a cloud identification service, etc.) of the malicious process.

For instance, the terminal device (the access subject) may send a service request for the access object via the application process, and when hijacking the service request, the access proxy sends a ticket request (corresponding to the above-mentioned credential request) to the security client, where the ticket request includes a source IP address (or a source domain name), a source port, a destination IP address (or a destination domain name) and a destination port in the service request, and further includes a PID corresponding to the application process, where the ticket corresponds to the above-mentioned service credential, and the PID is used for uniquely identifying the application process. When receiving a ticket request sent by the access proxy, the security client, according to the PID therein, collects the MD5 value, the process path, the latest modification time of the process, copyright information, signature information, and the like of the application process together with the source IP address (or source domain name), source port, destination IP address (or destination domain name) and destination port in the ticket request, and also together with the information about the user account in a login state in the security client, and the like, applies for the ticket to the security server. After receiving these pieces of information, the security server acquires a zero-trust strategy corresponding to the user account in a login state in the security client, and determines whether the user account has a right to access the service system (referring to a service system requested by the service request) through the application process (referring to an application process initiating the service request) according to the acquired zero-trust strategy; and if so, the security server may send a generated ticket, the maximum number of times the ticket is used and an effective usage duration of the ticket to the security client, so that the security client forwards the same to the access proxy.

Both synchronous and asynchronous aspects may be included in the ticket application process. For example, in the synchronous verification processing, the security client applies for a ticket from the security server, and the security server performs synchronous verification processing on the process characteristics of the application process, for example, verifying whether the application process is a trusted application, and whether the user account has a right to access a corresponding service system via the application process, etc. If a synchronous verification processing result obtained by the security server is verification success, the security server normally responds to the ticket, the maximum number of times the ticket is used and the effective usage duration of the ticket to the security client, and the security client sends the same to the access proxy. For example, the security client may send the same to the access proxy by means of local process communication (i.e., a Socket communication connection).

In the asynchronous verification processing, the security server may periodically send a file test request to a specific cloud server according to the process characteristics of the application process. If the security server acquires from the cloud server that the application process is a malicious process, the security client may be notified to execute an asynchronous blocking operation, such as disconnecting the communication connection with the access proxy.

After acquiring the ticket, the access proxy may send the ticket to the zero-trust gateway to enable the zero-trust gateway to verify. For example, the access proxy may add the ticket to an Authorization header field of a Hypertext Transfer Protocol Secure (HTTPS) request and send the HTTPS request to the zero-trust gateway. Upon receiving the HTTPS request, the zero-trust gateway parses out the ticket in the Authorization header field and verifies the ticket to the security server. If the zero-trust gateway verifies the ticket successfully, the zero-trust gateway successfully establishes a connection with the access proxy, and then the access proxy may send an original service request (hereafter referred to as a service request sent by an application process) to the zero-trust gateway, and the zero-trust gateway forwards the service request to a corresponding service system to proxy the network access of the application process to the service system; and if the zero-trust gateway fails to verify the ticket, the communication connection between the access proxy and the zero-trust gateway is disconnected, and the access proxy directly sends the original service request to a corresponding service system. In a zero-trust borderless office scenario, in order to ensure the security of network access, such access usually fails.

In some embodiments, the security server can adapt to medium-sized enterprises and institutions and governments through a single deployment mode, and can also adapt to large enterprise groups and multi-level vertical government e-government systems through a distributed cascade deployment mode.

Figure 19:
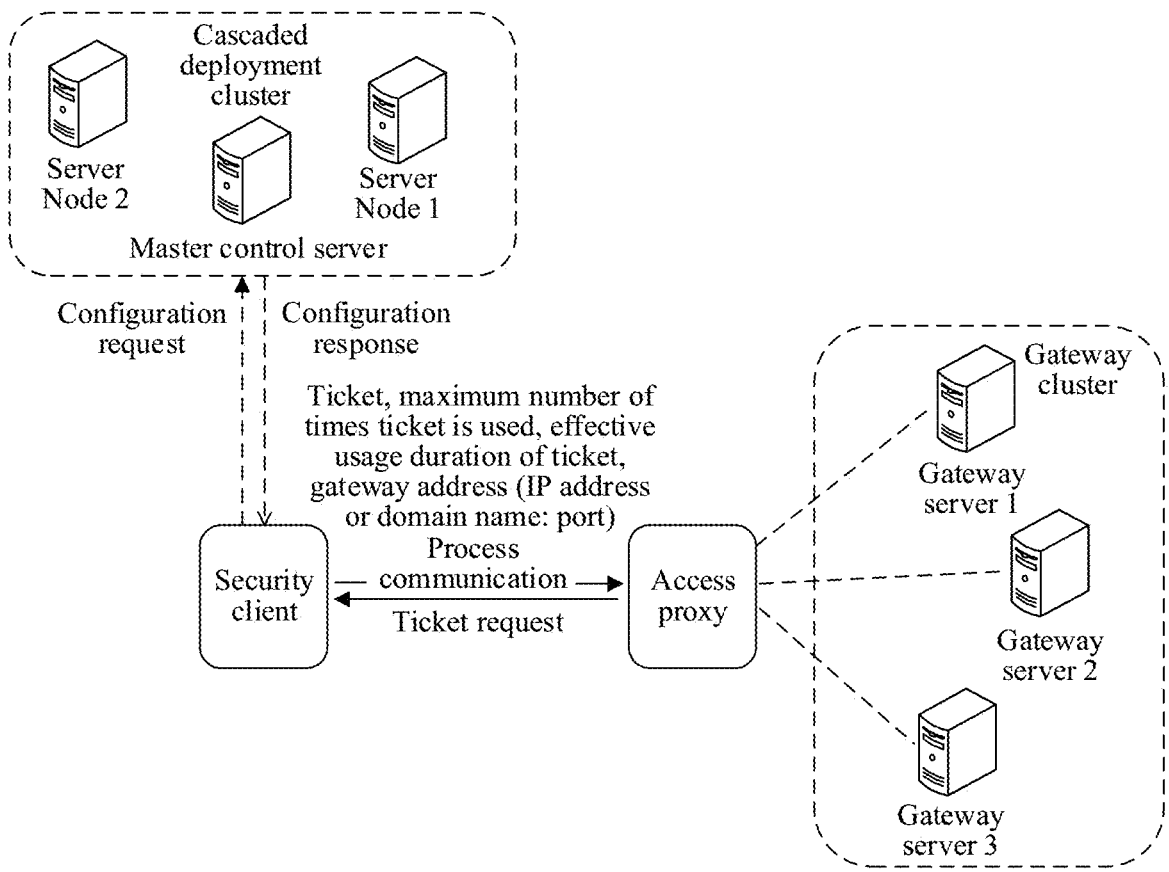
FIG. 19 is a schematic diagram of a security server cascade deployment according to some embodiments.

For example, in order to guarantee the stable operation of zero-trust network accessing to core services, a scheme that zero-trust core service is active from different places can be adopted. The core basic services are deployed in a master control node, and each different service is deployed in different secondary service nodes. As an example, some embodiments provide a schematic diagram of a cascaded deployment as shown in FIG. 19, in which a security server adopts the cascaded deployment mode including a master control node (master server) and a secondary service node (server node). The master control node has core basic services deployed therein, such as heartbeat services, strategy synchronization services and device management and control services. The configuration and data of the master control node may be periodically synchronized to each secondary service node; and at the same time, when the secondary service node has data and configuration needing to be changed, the master control node may be notified to modify, and after the modification of the master control node is completed, the corresponding secondary service node may be synchronized.

In some embodiments, the service access process of the access proxy may invoke an interface in the security client to realize data transfer. In order to ensure security, synchronous verification processing and asynchronous verification processing may be performed on the service access process of the access proxy, which are respectively described below.

1) Synchronous verification processing.

After the access proxy establishes a Socket connection with the security client, the security client acquires the PID of the service access process through an IP address and a port number of the access proxy. Then, the security client acquires a process path of the service access process according to the PID of the service access process, and detects whether the process path is located in an installation directory (corresponding to the above-mentioned security directory) of the security client. In some embodiments, the access proxy may be a component of the service communication system, and after normal installation, the access proxy is typically located in the installation directory of the secure client. Also, in some embodiments, the installation directory of the security client may be directory-protected to prevent services or processes of other non-service communication systems from operating on the installation directory.

By detecting whether the process path of the service access process is within the installation directory of the security client, the legitimacy of the access process may be preliminarily detected. If the process path of the service access process is located in the installation directory, signature information about a process file of the service access process may be further acquired, and verification processing is performed. When the security management and control intensity of an enterprise is low, the access of a service access process without a digital signature to the interface of the security client may be relaxed (authorized); and when the security management and control intensity of an enterprise is high, it may be restricted that only the service access process with a digital signature can access the interface of the security client. According to the difference in security management and control intensity, the following several verification processing on signature information may be implemented.

(1) Whether a process file of a service access process has a digital signature is detected, and if so, it is determined that the signature information is verification success.

(2) The security client locally performs validity verification processing on the digital signature, for example, API of WinVerifyTrust is invoked to perform the validity verification processing. If the validity verification processing is verification success, it is determined that the signature information is verification success.

(3) A signer name (corresponding to the above-mentioned signer) of a digital signature is acquired on the basis of performing the validity verification processing locally by the security client, and the signer name is matched with a signer blacklist. When the signer name is not on the signer blacklist, i.e., when the matching fails, it is determined that the signature information is verification success.

(4) The security client acquires certificate chain information (corresponding to the above-mentioned certificate information) about the process file of the service access process, for example, the certificate chain information may include an abstract algorithm, root certificate information, intermediate certificate information, signature certificate information, a signature state, a signer name, a time stamp and signature verification error information. The root certificate information includes a name, a serial number, expired time and the like of the root certificate. The same is true for the intermediate certificate information and the signature certificate information. In addition, the signature state may be used to indicate one of digital signature being available, digital signature being tampered with, certificate being untrusted, certificate expiring, certificate revocation, and other errors. After acquiring the certificate chain information, the security client may match the certificate chain information with a certificate chain information blacklist (corresponding to the above-mentioned certificate information blacklist), and if the matching fails, it is determined that the signature information is verification success.

The strength of security management and control in the above 4 modes is gradually enhanced, and accordingly, the time taken for verification processing will also become longer, and at least one mode can be selected to implement the verification processing of signature information according to the strength requirements and efficiency requirements of security management and control in practical application scenarios.

When the process path and the signature information of the service access process are both verified successfully, the security client can first allow interface invocation of the service access process to enter an interface authentication link.

2) Asynchronous verification processing.

In order to fully verify whether the service access process is a malicious process, the security client may acquire the process characteristics of the service access process asynchronously and send the same to the security server for the asynchronous verification processing. The process characteristics of the service access process include, but are not limited to, an MD5 value, a Hash value, a process path and signature information (including the certificate chain information) of the service access process. After receiving the process characteristics of the service access process, the security server may periodically send a file test request to a cloud server, and the cloud server judges whether the service access process is a malicious process according to a stored continuously updated process characteristic blacklist (corresponding to the above-mentioned process information blacklist). If the cloud server determines that the service access process is a malicious process, the security server notifies the security client so that the security client disconnects the Socket connection with the service access process.

Figure 20:
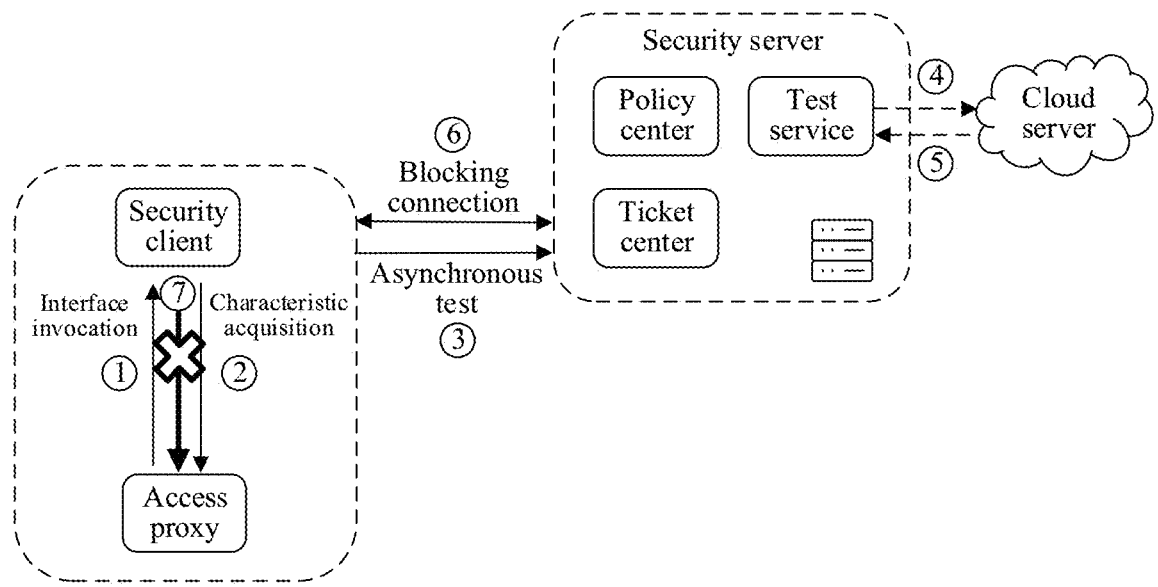
FIG. 20 is a schematic diagram of an asynchronous verification processing according to some embodiments.

As an example, some embodiments provide a schematic diagram of asynchronous verification processing as shown in FIG. 20, where the numbers in FIG. 20 indicate the operations of the asynchronous verification processing, and will be described in conjunction with the various operation shown.

(1) The access proxy attempts to invoke a relevant interface of the security client, i.e., sends an authentication request to the security client.

(2) The security client performs synchronous verification processing on the service access process (including verification processing on the process path and the signature information), and if a synchronous verification processing result is verification success, the process characteristics of the service access process are collected.

(3) The security client sends the process characteristics of the service access process to the security server, i.e., an asynchronous test is performed.

(4) The security server sends the process characteristics of the service access process to the cloud server, so that the cloud server judges whether the service access process is a malicious process.

(5) The cloud server sends an asynchronous verification processing result of the security server, i.e., whether the service access process is a malicious process.

(6) If the service access process is a malicious process, the security server notifies the security client to execute a connection blocking operation.

(7) The security client actively disconnects the Socket connection with the service access process.

Next, the interface authentication link between the security client and the service access process is described, and for ease of understanding, in the form of operations.

1) The service access process generates an asymmetric key pair.

When the service access process invokes the interface of the security client, an authorization of the security client for this invocation needs to be acquired. First, the asymmetric key pair is generated by the service access process, a private key privatekey in the asymmetric key pair may be encrypted and stored in an internal memory by the service access process, and a public key pubkey in the asymmetric key pair is used for sending the same to the security client.

An embodiment does not limit the way the asymmetric key pair is generated. For example, asymmetric key pair may be generated by an Rivest-Shamir-Adleman (RSA) algorithm.

2) The service access process invokes an authentication interface of the security client.

Here, the service access process sends an authentication request to the authentication interface of the security client. An example of the authentication request is as follows.

```
{
   "code": 0   //For a response code of an authentication request, if it
is 0, indicating a normal response
   "msg": ""//Response description information
   "data": base64encode(encrypt(plain_data, pubkey))
}
```

Where the plain_data indicates plaintext information of a packet body, and examples of the contents thereof are as follows.

```
{
"access_id": "id"   // access id, corresponding to the key identifier above
   "access_key": base64encode(aes_key)   // access dynamic key
}
```

Where encrypt (plain_data, pubkey) represents a result obtained after the security client encrypts the plaintext information plain_data of the data packet body according to the public key pubkey sent by the service access process, i.e., encrypt represents encryption. The access_key is a result obtained by executing base64encode by the security client on the symmetric key aes_key, and here, the security server may store a mapping relationship between the access_id and the access_key, and may also store the attributes such as the maximum number of uses and an effective usage duration of the access_key. The security client may also store access_id and the corresponding access_key (or the corresponding aes_key) locally for subsequent querying.

4) The service access process receives and parses the data packet responded by the security client.

When receiving the data packet returned by the security client, the service access process parses out a response code code in the data packet, and if the value of the response code code is 0, it indicates that the processing is normal; and the service access process further parses out a base64 plaintext of the data of the data packet via base64decode, and then decrypts the base64 plaintext via a private key privatekey encrypted and stored in the internal memory to obtain a plain_data.

The service access process then parses the access_id and the access_key from the plain_data and encrypts and stores the same in the internal memory. In some embodiments, access_id and access_key may be in a one-to-one relationship.

5) The service access process invokes a service interface of the security client.

Here, the service interface may be an interface for applying the ticket, and may also be other service interfaces. When the service access process invokes the service interface of the security client, an original parameter raw_param (corresponding to the request data above) sent to the service interface is processed as follows to form a call_param.

(1) The original parameter raw_param is encrypted using a symmetric key aes_key, i.e., encrypt (raw_param, aes_key). The content of the original parameter raw_param is not limited, and may be specifically set according to actual services.
(2) base64encode is executed for the result obtained in operation (1), i.e., base64encode (encrypt (raw_param, aes_key)).
(3) urlencode is executed for the result obtained in operation (2), i.e., urlencode (base64encode (encrypt (raw_param, aes_key))) to obtain call_param.

When the service access process invokes the service interface of the security client, the service access process simultaneously generates user-defined checking information signature (corresponding to the above-mentioned first checking information), and the operations of the generation are as follows.

(1) The service access process takes out access_id from the internal memory encrypted data as a first part (named A).
(2) base64encode is executed for the symmetric key aes_key to obtain a second part (named B), i.e., B=base64encode (aes_key).
(3) base64encode is executed for the parameter call_param to obtain a third part (named C), i.e., C=base64encode (call_param).
(4) A current time stamp timestamp is taken as a fourth part (named D).
(5) The character strings obtained in the above-mentioned 4 operations are added, and then an MD5 value is calculated to obtain user-defined checking information signature, i.e., signature=MD5 (A+B+C+D).

After obtaining the user-defined checking information signature, base64encode is executed to obtain Authorization public header information, which may be represented as:
Authorization:"IPN base64encode({"access_id": " ", "signature": " ", "timestamp": " "})"

Where timestamp represents a time stamp in generating signature, i.e., the above D. The service request sent by the service access process to the security client includes the above-mentioned call_param and Authorization common header information.

(6) The security client parses the service request sent by the service access process to the service interface, and detects whether the service request is valid.

When receiving the service request, the security client performs urldecode on the call_param in the service request and then performs base64decode to obtain encrypt (raw_param, aes_key). Then, encrypt (raw_param, aes_key) is decrypted using aes_key to obtain raw_param, which is the original parameter of the service access process.

For the Authorization public header information in the service request, the security client first performs base64 decode to obtain the plain text, i.e., the access_id, the user-defined checking information signature and the time stamp timestamp. Then, the security client queries locally according to the access_id to obtain a corresponding access_key (or aes_key), and then sends the queried access_key to the security server to detect whether the queried access_key is expired. If the queried access_key has expired, the security client triggers the invocation of the authentication interface to re-authenticate, i.e., enable the service access process to re-send the authentication request.

If the queried access_key has not expired, i.e., has not expired, the security client regenerates checking information Signature' (corresponding to the above-mentioned second checking information) according to the call_param in the service request, the access_id in the Authorization public header information, the timestamp in the Authorization public header information and the queried access_key, i.e., Signature'=MD5(access_id+base64encode(aes_key)+base 64encode(call_param)+timestamp), where base 64encode (aes_key) is the queried access_key.

The security client compares the generated checking information Signature' with the user-defined checking information Signature sent by the service access process, and if the two are the same, the security client determines that the service request is valid; and if the two are different, the parameter in the service request is proved to have been tampered with or forged, the security client determines that the service request is invalid, and the invocation of the service interface by the service access process is failed.

(7) The security client performs response processing on the original parameter in the service request to obtain response data, and returns the same to the service access process.

If the security client determines that the service request is valid, i.e., the invocation of the service interface by the service access process is valid, the security client performs response processing on the original parameter raw_param in the service request to obtain response data resultdata, and here, the specific content of the response data resultdata is not limited and may be set according to the actual service. An example of the data packet returned by the security client to the service access process is as follows.

```
{
    "retcode":0   //Response code for service request
    "msg": ""//Response description information may be set according to the practical application scenarios
    "data": base64encode(encrypt(resultdata, pubkey))
}
```

Where retcode represents a response code of a service request sent for the service access process, and if the retcode is 0, it indicates that the invocation of the service interface is successful; if retcode is 1, it indicates that the invocation of the service interface fails; and if retcode is 2, it indicates that the access_key (or aes_key) has expired, and the service access process is required to resend an authentication request, i.e., operation 2) is re-executed.

In some embodiments, the symmetric key required for interface authentication may be periodically updated at the security manager, and at each update, the security server may set all the access_id and access_key (or aes_key) before the update as invalid, thereby triggering the service access process to re-invoke the authentication interface of the security client to acquire the updated access_id and access_key.

For access_id and access_key (or aes_key), some embodiments may configure different granularities at the security manager. For example, it may be distinguished from the service access process itself and the service route sent when the service access process invokes the authentication interface. For instance, the service route when a service access process A invokes the authentication interface includes path1, path2 and path3, the service route when a service access process B invokes the authentication interface includes path4 and path5, and then there are the following three schemes for granularity division:

(1) the security server simultaneously distinguishes the service access processes and the service routes, i.e., allocating different access_id and access_key combination pairs for different service access processes, and allocating different access_id and access_key combination pairs for different service routes of the same service access process. For instance, for the path1, path2 and path3 of the service access process A, three groups of different access_id and access_key combination pairs are respectively allocated; and for the path4 and path5 of the service access process B, another two different groups of access_id and access_key combination pairs are allocated respectively.

(2) The security server only distinguishes the service access processes but not the service routes, i.e., allocating different access_id and access_key combination pairs for different service access processes, and allocating the same access_id and access_key combination pairs for different service routes of the same service access process. For instance, for the path1, path2 and path3 of the service access process A, a group of access_id and access_key combination pairs are allocated uniformly; and for the path4 and path5 of service access process B, another group of access_id and access_key combination pairs is allocated uniformly.

(3) The security server does not distinguish the service access processes and the access routes, i.e., a group of service_id and service key combination pairs is uniformly allocated for all service routes of all service access processes.

In a practical application scenario, an administrator may use any of the above-mentioned granularity division schemes according to the management and control degree of an enterprise.

For the replacement mechanism of access_id and access_key (or aes_key), the security server may configure at least one of the maximum usage times and the effective usage duration to realize the periodic update of access_id and access_key and improve the security.

In some embodiments, the security client can achieve the effective verification of the validity of the service access process by performing verification processing on the process path and the signature information about the service access process; and at the same time, whether the service access process is a malicious process can be accurately verified through asynchronous test of the process characteristics of the security client and cloud service detection of the security server. An embodiment improves both the verification accuracy of the service access process and the efficiency of a compliant service access process accessing the security client.

In addition, some embodiments provide an interface authentication scheme for verifying via a dynamic key and user-defined checking information, which can perform encrypted service communication according to the symmetric key issued by the security server and avoid the problem of key storage being broken; at the same time, the service key information can be updated periodically to strengthen the security of interface invocation; and it also allows the administrator to distinguish the service key information through different granularity division schemes according to the degree of management and control of each service, to improve the applicability to different services and different scenarios.

Continuing with an example structure of a terminal device 400 implemented as a software module, in some embodiments, as shown in FIG. 3, the software module stored in the service communication apparatus 455 of the memory 450 may include: a receiving module 4551 configured to receive an authentication request sent by a service access process; a verification module 4552 configured to perform synchronous verification processing on the service access process, and perform asynchronous verification processing on the service access process; a determination module 4553 configured to determine service key information allocated for the service access process according to a synchronous verification processing result of the service access process; a sending module 4554 configured to send the service key information to the service access process for encrypted service communication with the service access process based on the service key information; and a connection control module 4555 configured to control a communication connection used for bearing the encrypted service communication with the service access process according to an asynchronous verification processing result of the service access process.

In some embodiments, the verification module 4552 is further configured to: take a matching result between a process path of the service access process and a set security directory as a first verification processing result; verify the signature information about the service access process to obtain a second verification processing result; and determine a synchronous verification processing result of the service access process according to the first verification processing result and the second verification processing result.

In some embodiments, the verification module 4552 is also configured to determine the second verification processing result according to at least one of a result of whether the signature information includes a digital signature, a validity verification processing result of the digital signature, a matching result between a signer and a signer blacklist of the digital signature, and a matching result between certificate information in the signature information and a certificate information blacklist.

In some embodiments, the verification module 4552 is further configured to: determine a digital signature in the signature information, and a decryption key corresponding to the digital signature; decrypt the digital signature according to the decryption key to obtain a first hash result of a process file of the service access process; perform hash processing on the process file of the service access process to obtain a second hash result; and take a matching result between the first hash result and the second hash result as a validity verification processing result of the digital signature.

In some embodiments, the authentication request includes a public key of an asymmetric key pair generated by the service access process; where the asymmetric key pair includes the public key and a private key corresponding to the public key; the sending module 4554 is further configured to: encrypt the service key information according to the public key; and send the encrypted service key information to the service access process, so that the service access process decrypts the encrypted service key information according to the private key.

In some embodiments, the service key information includes a key identifier and a symmetric key; the service communication apparatus 455 further includes: a service receiving module configured to receive a service request sent by the service access process; where the service request includes the key identifier and request data encrypted using the symmetric key; a query module configured to query a symmetric key corresponding to the key identifier in the service request in the distributed symmetric key; a decryption module configured to decrypt the encrypted request data in the service request according to the queried symmetric key; a response module configured to perform response processing on the request data obtained by the decryption to obtain response data; and an encryption sending module configured to encrypt the response data according to the public key, and sending the encrypted response data to the service access process, so that the service access process decrypts the encrypted response data according to the private key.

In some embodiments, the service request further includes a time stamp and first checking information; where the first checking information is obtained by the service access process performing hash processing on the key identifier, the symmetric key, the time stamp and request data encrypted using the symmetric key; the response module is further configured to: perform hash processing on the key identifier, the queried symmetric key, the time stamp and the encrypted request data to obtain second checking information; and when a matching result between the first checking information and the second checking information is matching success, perform the response processing on the request data obtained by the decryption.

In some embodiments, the service communication apparatus 455 further includes: an expiration processing module configured to send expired information to the service access process when a usage parameter of the queried symmetric key satisfies an expired parameter condition, so that the service access process resends an authentication request when receiving the expired information; where the usage parameter includes at least one of a usage number and a usage duration.

In some embodiments, the authentication request includes an authentication request address. The determination module 4553 is further configured to execute any of the following processing: allocating different service key information with respect to authentication request addresses sent by the different service access processes, and allocating different service key information with respect to different authentication request addresses sent by the same service access process; allocating different service key information with respect to authentication request addresses sent by the different service access processes, and allocating same service key information with respect to different authentication request addresses sent by the same service access process; and allocating same service key information with respect to authentication request addresses sent by the different service access processes, and allocating same service key information with respect to different authentication request addresses sent by the same service access process.

In some embodiments, the verification module 4552 is further configured to: periodically match process information about the service access process with a process information blacklist, and take the obtained matching result as an asynchronous verification processing result of the service access process.

In some embodiments, the determination module 4553 is further configured to: determine service key information allocated for the service access process when a synchronous verification processing result of the service access process is verification success; execute any of the following processing when the synchronous verification processing result of the service access process is verification failure: notifying the service access process to resend the authentication request; disconnecting a communication connection used for transmitting the authentication request with the service access process; and interrupting the asynchronous verification processing on the service access process.

In some embodiments, the connection control module 4555 is further configured to: maintain the communication connection for bearing the encrypted service communication with the service access process when an asynchronous verification processing result of the service access process is verification success; and disconnect the communication connection for bearing the encrypted service communication with the service access process when the asynchronous verification processing result of the service access process is verification failure.

In some embodiments, the service communication apparatus 455 further includes: an encrypted communication module configured to: execute the following processing in the process of the encrypted service communication: receiving a credential request sent by the service access process; where the credential request is sent by the service access process when intercepting a service request of an application process, and a destination address of the service request is an address of a service server; performing synchronous verification processing on the application process; determining a service credential and a gateway address allocated for the application process, and sending the service credential and the gateway address to the service access process according to a synchronous verification processing result of the application process, so that the service access process sends the service credential and the service request to a service gateway corresponding to the gateway address; where the service gateway is configured to perform verification processing on the received service credential, and send the received service request to the service server when the verification processing result of the service credential is verification success; and the service server is configured to perform response processing on the request data in the received service request.

In some embodiments, the encrypted communication module is further configured to: determine a user account in a login state in a device where the application process is located, and acquire process information about a trusted application process corresponding to the user account and an address of an accessible service server corresponding to the user account; take a matching result between process information about the application process and process information about the trusted application process as a third verification processing result; take a matching result between the address of the service server requested by the service request and the address of the accessible service server as a fourth verification processing result; acquire device information about the device where the application process is located, and take a matching result between the device information and device security conditions as a fifth verification processing result; and determine a synchronous verification processing result of the application process according to the third verification processing result, the fourth verification processing result and the fifth verification processing result.

In some embodiments, the encrypted communication module is further configured to: periodically match the process information about the application process with a process information blacklist, and take the obtained matching result as an asynchronous verification processing result of the application process; and control a communication connection used for bearing the encrypted service communication with the service access process according to an asynchronous verification processing result of the application process.

Some embodiments provide a computer program product or a computer program. The computer program product or the computer program includes computer instructions (executable instructions), and the computer instructions are stored in a computer-readable storage medium. A processor of a computer device reads the computer instructions from the computer-readable storage medium, and executes the computer instructions, causing the computer device to perform the foregoing service communication method according to the embodiments.

Some embodiments provide a non-transitory computer-readable storage medium storing executable instructions. When the executable instructions are executed by a processor, the processor is caused to perform the method, such as the service communication method shown in FIG. 4A, FIG. 4B, FIG. 4C, FIG. 4D and FIG. 4E.

In some embodiments, the computer-readable storage medium may be a memory such as an a Ferroelectric Random-Access Memory (FRAM), a Read-Only Memory (ROM), a Programmable Read-Only Memory (PROM), an Erasable Programmable Read-Only Memory (EPROM), an Electrically Erasable Programmable Read-Only Memory (EEPROM), a flash memory, a magnetic surface memory, an optical disk, or a Compact Disc Read-Only Memory (CD-ROM); or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

As an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

As an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing are merely embodiments of the disclosure and are not intended to limit the protection scope of the disclosure. Any modification, equivalent replacement, or improvement made without departing from the spirit and scope of the disclosure shall fall within the protection scope of the disclosure.

What is claimed is:

1. A service communication method, executed by an electronic device, the method including:
   receiving an authentication request sent by a service access process;
   performing synchronous verification processing on the service access process, and performing asynchronous verification processing on the service access process;
   determining service key information allocated for the service access process according to a synchronous verification processing result of the service access process;
   sending the service key information to the service access process for encrypted service communication with the service access process based on the service key information; and
   controlling a communication connection used for bearing the encrypted service communication with the service access process according to an asynchronous verification processing result of the service access process.

2. The service communication method according to claim 1, wherein the performing synchronous verification processing comprises:
    taking a matching result between a process path of the service access process and a set security directory as a first verification processing result;
    verifying signature information about the service access process to obtain a second verification processing result; and
    determining the synchronous verification processing result of the service access process according to the first verification processing result and the second verification processing result.

3. The service communication method according to claim 2, wherein the verifying signature information comprises:
    determining the second verification processing result according to at least one of a result of whether the signature information comprises a digital signature, a validity verification processing result of the digital signature, a matching result between a signer and a signer blacklist of the digital signature, and a matching result between certificate information in the signature information and a certificate information blacklist.

4. The service communication method according to claim 3, wherein the method further comprises:
    determining a digital signature in the signature information, and a decryption key corresponding to the digital signature;
    decrypting the digital signature according to the decryption key to obtain a first hash result of a process file of the service access process;
    performing hash processing on the process file of the service access process to obtain a second hash result; and
    taking a matching result between the first hash result and the second hash result as the validity verification processing result of the digital signature.

5. The service communication method according to claim 1, wherein the authentication request comprises a public key of an asymmetric key pair generated by the service access process; wherein the asymmetric key pair comprises the public key and a private key corresponding to the public key;
    the sending the service key information to the service access process comprises:
    encrypting the service key information according to the public key; and
    sending the encrypted service key information to the service access process, so that the service access process decrypts the encrypted service key information according to the private key.

6. The service communication method according to claim 5, wherein the service key information comprises a key identifier and a symmetric key; and
    upon sending the encrypted service key information to the service access process, the method further comprises:
    receiving a service request sent by the service access process; wherein the service request comprises the key identifier and request data encrypted using the symmetric key;
    querying a symmetric key corresponding to the key identifier in the service request in distributed symmetric keys;
    decrypting the encrypted request data in the service request according to the queried symmetric key;
    performing response processing on the request data obtained by the decryption to obtain response data; and
    encrypting the response data according to the public key, and sending the encrypted response data to the service access process, so that the service access process decrypts the encrypted response data according to the private key.

7. The service communication method according to claim 6, wherein the service request further comprises a time stamp and first checking information; wherein the first checking information is obtained by the service access process performing hash processing on the key identifier, the symmetric key, the time stamp, and request data encrypted using the symmetric key; and
    the performing response processing comprises:
    performing hash processing on the key identifier, the queried symmetric key, the time stamp, and the encrypted request data to obtain second checking information; and
    performing response processing on the request data obtained by the decryption in a case that a matching result between the first checking information and the second checking information is matching success.

8. The service communication method according to claim 6, wherein upon the querying a symmetric key, the method further comprises:
    sending expired information to the service access process in a case that a usage parameter of the queried symmetric key satisfies an expired parameter condition, so that the service access process resends an authentication request in response to receiving the expired information;
    wherein the usage parameter comprises at least one of a usage number and a usage duration.

9. The service communication method according to claim 1, wherein the authentication request comprises an authentication request address; and
    the determining service key information allocated for the service access process comprises:
    executing any of the following processing:
    allocating different service key information with respect to authentication request addresses sent by different service access processes, and allocating different service key information with respect to different authentication request addresses sent by a same service access process;
    allocating different service key information with respect to authentication request addresses sent by the different service access processes, and allocating same service key information with respect to different authentication request addresses sent by the same service access process; and
    allocating same service key information with respect to authentication request addresses sent by the different service access processes, and allocating same service key information with respect to different authentication request addresses sent by the same service access process.

10. The service communication method according to claim 1, wherein the determining service key information comprises:
    determining service key information allocated for the service access process in a case that a synchronous verification processing result of the service access process is verification success; and
    the method further comprises:
    executing any of the following processing in a case that the synchronous verification processing result of the service access process is verification failure:

notifying the service access process to resend an authentication request;
disconnecting a communication connection used for transmitting the authentication request with the service access process; and
interrupting the asynchronous verification processing on the service access process.

11. The service communication method according to claim 1, wherein the controlling a communication connection comprises:
maintaining the communication connection for bearing the encrypted service communication with the service access process in a case that the asynchronous verification processing result of the service access process is verification success; and
disconnecting the communication connection for bearing the encrypted service communication with the service access process in a case that the asynchronous verification processing result of the service access process is verification failure.

12. The service communication method of according to claim 1, wherein the method further comprises:
executing the following processing in the process of the encrypted service communication:
receiving a credential request sent by the service access process; wherein the credential request is sent by the service access process in response to intercepting a service request of an application process, and a destination address of the service request is an address of a service server;
performing synchronous verification processing on the application process;
determining a service credential and a gateway address allocated for the application process, and sending the service credential and the gateway address to the service access process according to a synchronous verification processing result of the application process, so that
the service access process sends the service credential and the service request to a service gateway corresponding to the gateway address;
wherein the service gateway is configured to perform verification processing on the received service credential, and send the received service request to the service server in a case that a verification processing result of the service credential is verification success; and the service server is configured to perform response processing on request data in the received service request.

13. The service communication method according to claim 12, wherein the performing synchronous verification processing on the application process comprises:
determining a user account in a login state in a device where the application process is located, and acquiring process information about a trusted application process corresponding to the user account and an address of an accessible service server corresponding to the user account;
taking a matching result between process information about the application process and the process information about the trusted application process as a third verification processing result;
taking a matching result between the address of the service server requested by the service request and the address of the accessible service server as a fourth verification processing result;
acquiring device information about the device where the application process is located, and taking a matching result between the device information and device security conditions as a fifth verification processing result; and
determining a synchronous verification processing result of the application process according to the third verification processing result, the fourth verification processing result and the fifth verification processing result.

14. The service communication method according to claim 12, wherein upon receiving a credential request sent by the service access process, the method further comprises:
periodically matching process information about the application process with a process information blacklist, and taking the obtained matching result as an asynchronous verification processing result of the application process; and
controlling a communication connection used for bearing the encrypted service communication with the service access process according to the asynchronous verification processing result of the application process.

15. The service communication method according to claim 1, wherein the performing asynchronous verification processing comprises:
periodically matching process information about the service access process with a process information blacklist, and taking the obtained matching result as an asynchronous verification processing result of the service access process.

16. A service communication apparatus comprising:
at least one memory configured to store program code; and
at least one processor configured to read the program code and operate as instructed by the program code, the program code comprising:
receiving code configured to cause the at least one processor to receive an authentication request sent by a service access process;
verification code configured to cause the at least one processor to perform synchronous verification processing on the service access process, and perform asynchronous verification processing on the service access process;
determination code configured to cause the at least one processor to determine service key information allocated for the service access process according to a synchronous verification processing result of the service access process;
sending code configured to cause the at least one processor to send the service key information to the service access process for encrypted service communication with the service access process based on the service key information; and
connection control code configured to cause the at least one processor to control a communication connection used for bearing the encrypted service communication with the service access process according to an asynchronous verification processing result of the service access process.

17. The service communication apparatus according to claim 16, wherein the verification code is further configured to cause the at least one processor to:
take a matching result between a process path of the service access process and a set security directory as a first verification processing result;
verify signature information about the service access process to obtain a second verification processing result; and determine the synchronous verification processing result of the service access process according to the first verification processing result and the second verification processing result.

18. The service communication apparatus according to claim 17, wherein the verification code is further configured to cause the at least one processor to:
   determine the second verification processing result according to at least one of a result of whether the signature information comprises a digital signature, a validity verification processing result of the digital signature, a matching result between a signer and a signer blacklist of the digital signature, and a matching result between certificate information in the signature information and a certificate information blacklist.

19. The service communication apparatus according to claim 18, wherein the verification code is further configured to cause the at least one processor to:
   determine a digital signature in the signature information, and a decryption key corresponding to the digital signature;
   decrypt the digital signature according to the decryption key to obtain a first hash result of a process file of the service access process;
   perform hash processing on the process file of the service access process to obtain a second hash result; and
   take a matching result between the first hash result and the second hash result as the validity verification processing result of the digital signature.

20. A non-transitory computer-readable storage medium, storing computer code that when executed by at least one processor causes the at least one processor to:
   receive an authentication request sent by a service access process;
   perform synchronous verification processing on the service access process, and perform asynchronous verification processing on the service access process;
   determine service key information allocated for the service access process according to a synchronous verification processing result of the service access process;
   send the service key information to the service access process for encrypted service communication with the service access process based on the service key information; and
   control a communication connection used for bearing the encrypted service communication with the service access process according to an asynchronous verification processing result of the service access process.

* * * * *